US012675103B2

(12) United States Patent　　　　　(10) Patent No.:　US 12,675,103 B2
Tang et al.　　　　　　　　　　　　(45) Date of Patent: 　　Jul. 7, 2026

(54) SYSTEM AND METHOD FOR OPTIMAL SENSOR PLACEMENT

(71) Applicant: GE-Hitachi Nuclear Energy Americas LLC, Wilmington, NC (US)

(72) Inventors: Liang Tang, Glastonbury, CT (US); Scott Charles Evans, Burnt Hills, NY (US); Abhinav Saxena, Milpitas, CA (US); Helena Goldfarb, Niskayuna, NY (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 347 days.

(21) Appl. No.: 18/428,521

(22) Filed: Jan. 31, 2024

(65) Prior Publication Data

US 2024/0319723 A1　　　Sep. 26, 2024

Related U.S. Application Data

(60) Provisional application No. 63/453,557, filed on Mar. 21, 2023.

(51) Int. Cl.
G05B 23/02　　　　(2006.01)
(52) U.S. Cl.
CPC .............................. G05B 23/0275 (2013.01)
(58) Field of Classification Search
CPC ............ G05B 23/0275; G05B 23/0297; G05B 23/0213; G06F 2111/04; G06F 2111/08;
(Continued)

(56) References Cited

U.S. PATENT DOCUMENTS 9,964,468 B1　　5/2018　Wu et al.
2013/0262068 A1*　10/2013　Israeli ...................... F17D 5/02
　　　　　　　　　　　　　　　　　　　703/9

(Continued)

OTHER PUBLICATIONS

Tang et al., "OSPtk: Cost-aware Optimal Sensor Placement Toolkit Enabling Design-for-PHM in Critical Industrial Systems," Annual Conference of the Prognostics and Health Management Society 2023, GE Global Research, Niskayuna, NY, 12309, USA.

(Continued)

*Primary Examiner* — Jigneshkumar C Patel
(74) *Attorney, Agent, or Firm* — Harness, Dickey & Pierce, P.L.C.

(57)　　　　　　ABSTRACT

A system, apparatus, method, and non-transitory computer readable medium for performing improved and/or optimal sensor placement may include a computing device caused to, receive a plurality of fault conditions and an initial sensor suite associated with at least one object to be simulated, the initial sensor suite including a plurality of candidate physical sensors for the at least one object, perform failure mode analysis of the initial sensor suite, the performing the failure mode analysis including generating at least one dependency-matrix (D-matrix) based on the plurality of fault conditions and the plurality of candidate physical sensors, and generate a recommended sensor suite associated with the at least one object based on results of the failure mode analysis, the recommended sensor suite including at least one recommended sensor, the at least one recommended sensor being a subset of the plurality of candidate physical sensors.

20 Claims, 14 Drawing Sheets

(58) Field of Classification Search
CPC .. G06F 2111/10; G06F 2119/02; G06F 30/12;
G06F 30/17; G06F 30/20
USPC .......................................................... 700/79
See application file for complete search history.

(56) References Cited

U.S. PATENT DOCUMENTS

| | | | |
|---|---|---|---|
| 2018/0060832 A1* | 3/2018 | Korsedal, IV | ...... G01M 99/005 |
| 2019/0068461 A1* | 2/2019 | Barkie | ................ H04L 41/5009 |
| 2021/0363829 A1* | 11/2021 | Ghimire | .................... E21B 7/06 |

OTHER PUBLICATIONS

International Search Report and Written Opinion for International
Application No. PCT/US2024/020701 mailed Dec. 11, 2024.
International Preliminary Report on Patentability dated Oct. 2, 2025
for corresponding International Application No. PCT/US2024/
020701.

* cited by examiner

|    | S1  | S2  | S3  | ... | Sm  |
|----|-----|-----|-----|-----|-----|
| F1 | P11 | P12 | P13 |     | P1m |
| F2 | P21 | P22 | P23 |     | P2m |
| F3 | P31 | P32 | P33 |     | P3m |
| ...|     |     |     |     |     |
| Fn | Pn1 | Pn2 | Pn3 |     | Pnm |

← Symptom/ Sensor
- Costs
- Failure Rate
- Grouping
- Mandatory

↑ Failure Mode (failure rate, criticality, ...)

FIG. 4A

Mandatory Sensor        Virtual Sensor

|    | S1  | S2  | S3  | S4  | VS5 |
|----|-----|-----|-----|-----|-----|
| F1 | 0   | 0.6 | 0.8 | 0   | 0.9 |
| F2 | 0   | 0.5 | 0.9 | 0   | 0.9 |
| F3 | 0   | 0.4 | 0.9 | 0.7 | 0   |
| F4 | 0   | 0.7 | 0.7 | 0   | 0   |
| F5 | 0.9 | 0   | 0   | 0   | 0   |
| F6 | 0   | 0   | 0   | 0.8 | 0   |

Sensor Group

FIG. 4B

Preliminary FMECA (SME Experience) — 401

| | S1 | S2 | S3 | S4 |
|---|---|---|---|---|
| F1 | 0 | 1 | 1 | 0 |
| F2 | 0 | 1 | 1 | 0 |
| F3 | 0 | 1 | 1 | 1 |
| F4 | 0 | 1 | 1 | 0 |
| F5 | 1 | 0 | 0 | 0 |
| F6 | 0 | 0 | 0 | 1 |

Refined FMECA (Simulations) — 402

| | S1 | S2 | S3 | S4 |
|---|---|---|---|---|
| F1 | 0 | 0.6 | 0.8 | 0 |
| F2 | 0 | 0.5 | 0.9 | 0 |
| F3 | 0 | 0.4 | 0.9 | 0.7 |
| F4 | 0 | 0.7 | 0.7 | 0 |
| F5 | 0.9 | 0 | 0 | 0 |
| F6 | 0 | 0 | 0 | 0.8 |

Simulation Available

Analytics Available

Evolution Of D-Matrix At Different Stages

Mandatory Sensor | Sensor Group | Virtual Sensor — 403

| | S1 | S2 | S3 | S4 | VS5 |
|---|---|---|---|---|---|
| F1 | 0 | 0.6 | 0.8 | 0 | 0.9 |
| F2 | 0 | 0.5 | 0.9 | 0 | 0.9 |
| F3 | 0 | 0.4 | 0.9 | 0.7 | 0 |
| F4 | 0 | 0.7 | 0.7 | 0 | 0 |
| F5 | 0.9 | 0 | 0 | 0 | 0 |
| F6 | 0 | 0 | 0 | 0.8 | 0 |

Polarity Of Shifts (Qualitative) — 404

| | S1 | S2 | S3 | S4 | VS5 |
|---|---|---|---|---|---|
| F1 | 0 | + | + | 0 | + |
| F2 | 0 | + | + | 0 | - |
| F3 | 0 | + | - | + | |
| F4 | 0 | + | + | 0 | |
| F5 | + | 0 | 0 | 0 | |
| F6 | 0 | 0 | 0 | - | |

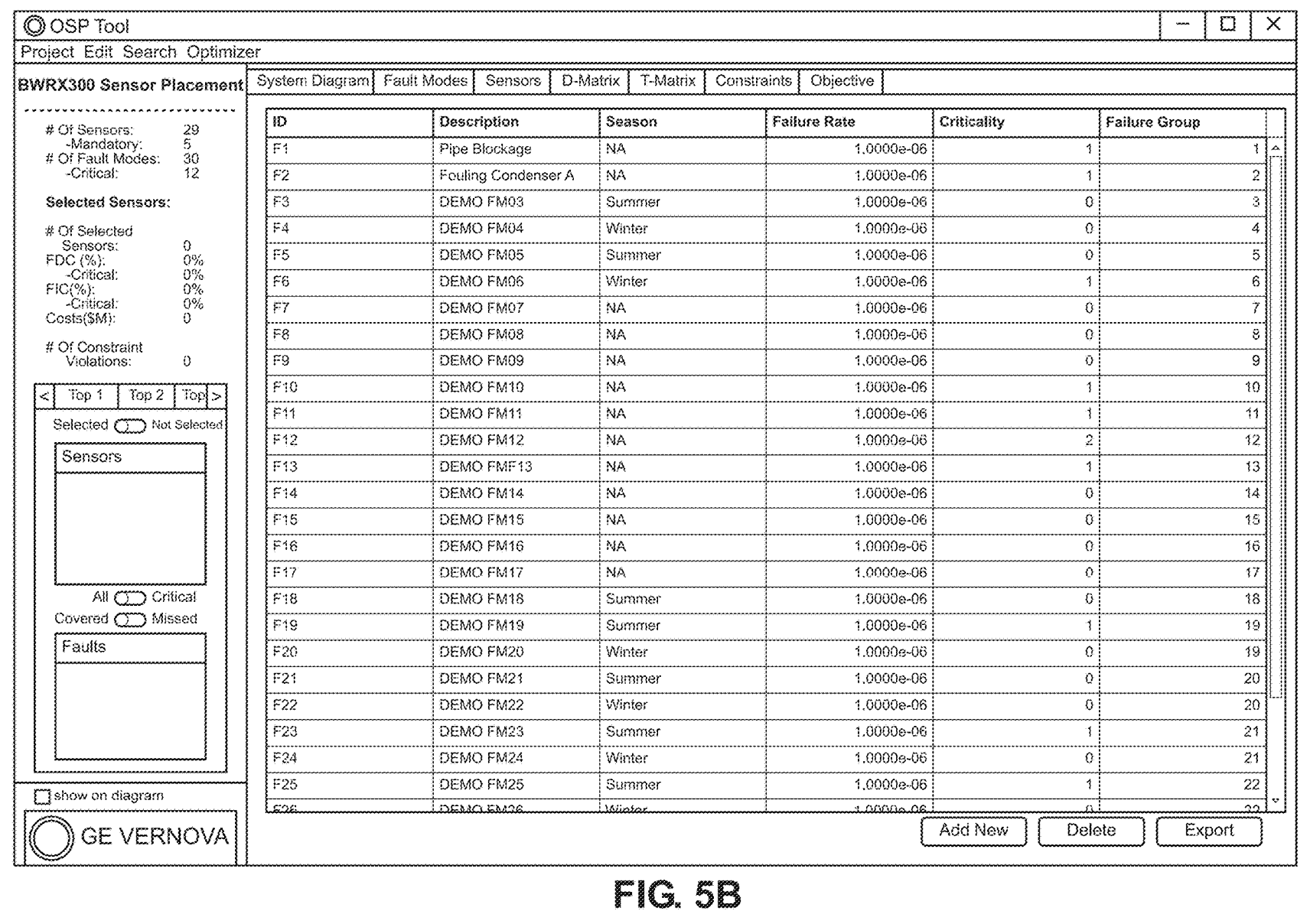

OSP Tool

Project Edit Search Optimizer

BWRX300 Sensor Placement

System Diagram | Fault Modes | Sensors | D-Matrix | T-Matrix | Constraints | Objective

Of Sensors: 29
  -Mandatory: 5
Of Fault Modes: 30
  -Critical: 12

Selected Sensors:

Of Selected Sensors: 0
FDC (%): 0%
  -Critical: 0%
FIC(%): 0%
  -Critical: 0%
Costs($M): 0

Of Constraint Violations: 0

| ID | Description | Season | Failure Rate | Criticality | Failure Group |
|---|---|---|---|---|---|
| F1 | Pipe Blockage | NA | 1.0000e-06 | 1 | 1 |
| F2 | Fouling Condenser A | NA | 1.0000e-06 | 1 | 2 |
| F3 | DEMO FM03 | Summer | 1.0000e-06 | 0 | 3 |
| F4 | DEMO FM04 | Winter | 1.0000e-06 | 0 | 4 |
| F5 | DEMO FM05 | Summer | 1.0000e-06 | 0 | 5 |
| F6 | DEMO FM06 | Winter | 1.0000e-06 | 1 | 6 |
| F7 | DEMO FM07 | NA | 1.0000e-06 | 0 | 7 |
| F8 | DEMO FM08 | NA | 1.0000e-06 | 0 | 8 |
| F9 | DEMO FM09 | NA | 1.0000e-06 | 0 | 9 |
| F10 | DEMO FM10 | NA | 1.0000e-06 | 1 | 10 |
| F11 | DEMO FM11 | NA | 1.0000e-06 | 1 | 11 |
| F12 | DEMO FM12 | NA | 1.0000e-06 | 2 | 12 |
| F13 | DEMO FMF13 | NA | 1.0000e-06 | 1 | 13 |
| F14 | DEMO FM14 | NA | 1.0000e-06 | 0 | 14 |
| F15 | DEMO FM15 | NA | 1.0000e-06 | 0 | 15 |
| F16 | DEMO FM16 | NA | 1.0000e-06 | 0 | 16 |
| F17 | DEMO FM17 | NA | 1.0000e-06 | 0 | 17 |
| F18 | DEMO FM18 | Summer | 1.0000e-06 | 0 | 18 |
| F19 | DEMO FM19 | Summer | 1.0000e-06 | 1 | 19 |
| F20 | DEMO FM20 | Winter | 1.0000e-06 | 0 | 19 |
| F21 | DEMO FM21 | Summer | 1.0000e-06 | 0 | 20 |
| F22 | DEMO FM22 | Winter | 1.0000e-06 | 0 | 20 |
| F23 | DEMO FM23 | Summer | 1.0000e-06 | 1 | 21 |
| F24 | DEMO FM24 | Winter | 1.0000e-06 | 0 | 21 |
| F25 | DEMO FM25 | Summer | 1.0000e-06 | 1 | 22 |
| F26 | DEMO FM26 | Winter | 1.0000e-06 | 0 | 0 |

Top 1 | Top 2 | Top| >

Selected / Not Selected

Sensors

All / Critical
Covered / Missed

Faults

Add New   Delete   Export

☐ show on diagram

GE VERNOVA

FIG. 5B

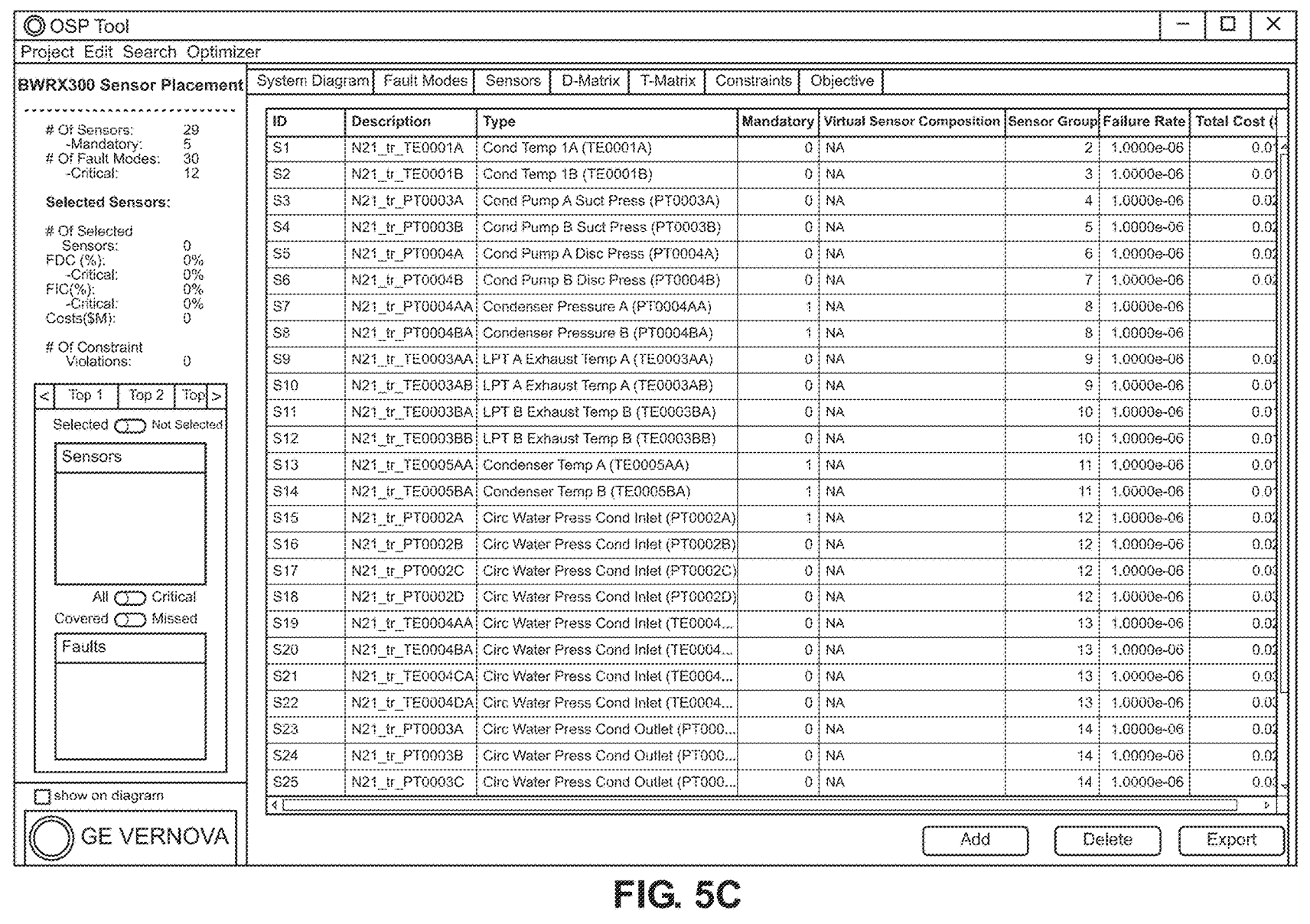

OSP Tool

Project Edit Search Optimizer

BWRX300 Sensor Placement

System Diagram | Fault Modes | Sensors | D-Matrix | T-Matrix | Constraints | Objective

Of Sensors: 29
-Mandatory: 5
Of Fault Modes: 30
-Critical: 12

Selected Sensors:

Of Selected Sensors: 0
FDC (%): 0%
-Critical: 0%
FIC(%): 0%
-Critical: 0%
Costs($M): 0

Of Constraint Violations: 0

Top 1 | Top 2 | Top >

Selected / Not Selected
Sensors

All / Critical
Covered / Missed
Faults

☐ show on diagram

GE VERNOVA

| ID | Description | Type | Mandatory | Virtual Sensor Composition | Sensor Group | Failure Rate | Total Cost ( |
|---|---|---|---|---|---|---|---|
| S1 | N21_tr_TE0001A | Cond Temp 1A (TE0001A) | 0 | NA | 2 | 1.0000e-06 | 0.0 |
| S2 | N21_tr_TE0001B | Cond Temp 1B (TE0001B) | 0 | NA | 3 | 1.0000e-06 | 0.0 |
| S3 | N21_tr_PT0003A | Cond Pump A Suct Press (PT0003A) | 0 | NA | 4 | 1.0000e-06 | 0.0 |
| S4 | N21_tr_PT0003B | Cond Pump B Suct Press (PT0003B) | 0 | NA | 5 | 1.0000e-06 | 0.0 |
| S5 | N21_tr_PT0004A | Cond Pump A Disc Press (PT0004A) | 0 | NA | 6 | 1.0000e-06 | 0.0 |
| S6 | N21_tr_PT0004B | Cond Pump B Disc Press (PT0004B) | 0 | NA | 7 | 1.0000e-06 | 0.0 |
| S7 | N21_tr_PT0004AA | Condenser Pressure A (PT0004AA) | 1 | NA | 8 | 1.0000e-06 |  |
| S8 | N21_tr_PT0004BA | Condenser Pressure B (PT0004BA) | 1 | NA | 8 | 1.0000e-06 | 0.0 |
| S9 | N21_tr_TE0003AA | LPT A Exhaust Temp A (TE0003AA) | 0 | NA | 9 | 1.0000e-06 | 0.0 |
| S10 | N21_tr_TE0003AB | LPT A Exhaust Temp A (TE0003AB) | 0 | NA | 9 | 1.0000e-06 | 0.0 |
| S11 | N21_tr_TE0003BA | LPT B Exhaust Temp B (TE0003BA) | 0 | NA | 10 | 1.0000e-06 | 0.0 |
| S12 | N21_tr_TE0003BB | LPT B Exhaust Temp B (TE0003BB) | 0 | NA | 10 | 1.0000e-06 | 0.0 |
| S13 | N21_tr_TE0005AA | Condenser Temp A (TE0005AA) | 1 | NA | 11 | 1.0000e-06 | 0.0 |
| S14 | N21_tr_TE0005BA | Condenser Temp B (TE0005BA) | 1 | NA | 11 | 1.0000e-06 | 0.0 |
| S15 | N21_tr_PT0002A | Circ Water Press Cond Inlet (PT0002A) | 1 | NA | 12 | 1.0000e-06 | 0.0 |
| S16 | N21_tr_PT0002B | Circ Water Press Cond Inlet (PT0002B) | 0 | NA | 12 | 1.0000e-06 | 0.0 |
| S17 | N21_tr_PT0002C | Circ Water Press Cond Inlet (PT0002C) | 0 | NA | 12 | 1.0000e-06 | 0.0 |
| S18 | N21_tr_PT0002D | Circ Water Press Cond Inlet (PT0002D) | 0 | NA | 12 | 1.0000e-06 | 0.0 |
| S19 | N21_tr_TE0004AA | Circ Water Press Cond Inlet (TE0004...) | 0 | NA | 13 | 1.0000e-06 | 0.0 |
| S20 | N21_tr_TE0004BA | Circ Water Press Cond Inlet (TE0004...) | 0 | NA | 13 | 1.0000e-06 | 0.0 |
| S21 | N21_tr_TE0004CA | Circ Water Press Cond Inlet (TE0004...) | 0 | NA | 13 | 1.0000e-06 | 0.0 |
| S22 | N21_tr_TE0004DA | Circ Water Press Cond Inlet (TE0004...) | 0 | NA | 13 | 1.0000e-06 | 0.0 |
| S23 | N21_tr_PT0003A | Circ Water Press Cond Outlet (PT000...) | 0 | NA | 14 | 1.0000e-06 | 0.0 |
| S24 | N21_tr_PT0003B | Circ Water Press Cond Outlet (PT000...) | 0 | NA | 14 | 1.0000e-06 | 0.0 |
| S25 | N21_tr_PT0003C | Circ Water Press Cond Outlet (PT000...) | 0 | NA | 14 | 1.0000e-06 | 0.0 |

Add    Delete    Export

FIG. 5C

OSP Tool

Project Edit Search Optimizer

BWRX300 Sensor Placement

System Diagram | Fault Modes | Sensors | D-Matrix | T-Matrix | Constraints | Objective

Of Sensors: 29
  -Mandatory: 5
Of Fault Modes: 30
  -Critical: 12

Selected Sensors:

Of Selected Sensors: 0
FDC (%): 0%
  -Critical: 0%
FIC (%): 0%
  -Critical: 0%
Costs ($M): 0

Of Constraint Violations: 0

Top 1 | Top 2 | Top >

Selected / Not Selected
Sensors

All / Critical
Covered / Missed
Faults

[ ] show on diagram

GE VERNOVA

Export...

| | S1 | S2 | S3 | S4 | S5 | S6 | S7 | S8 | S9 | S10 | S11 |
|---|---|---|---|---|---|---|---|---|---|---|---|
| F1 | 0.8300 | 0.8300 | 0.8200 | 0.8200 | 0.8200 | 0.8000 | 0.7500 | 0.8300 | 0.8700 | 0.8200 | 0.8200 |
| F2 | 0.2500 | 0.2500 | 0.2400 | 0.2400 | 0.2400 | 0.1100 | 0.0700 | 0.2400 | 0.2700 | 0.2400 | 0.2400 |
| F3 | 0 | 0 | 0 | 0 | 0 | 1.0000 | 1.0000 | 0 | 0 | 0 | 0 |
| F4 | 1.0000 | 0 | 0 | 0 | 0 | 1.0000 | 1.0000 | 0 | 0 | 0 | 0 |
| F5 | 0 | 0 | 1.0000 | 1.0000 | 1.0000 | 0 | 0 | 0 | 1.0000 | 0 | 0 |
| F6 | 0 | 0 | 1.0000 | 1.0000 | 1.0000 | 0 | 0 | 0 | 0 | 1.0000 | 1.0000 |
| F7 | 0 | 0 | 0 | 0 | 0 | 1.0000 | 0 | 0 | 0 | 0 | 0 |
| F8 | 0 | 0 | 0 | 0 | 0 | 0 | 0 | 0 | 0 | 0 | 0 |
| F9 | 1.0000 | 1.0000 | 0 | 0 | 0 | 1.0000 | 0 | 0 | 0 | 0 | 0 |
| F10 | 1.0000 | 0 | 0 | 0 | 0 | 0 | 0 | 0 | 0 | 0 | 0 |
| F11 | 0 | 0 | 0.6000 | 0 | 0.8000 | 0 | 0 | 0 | 1.0000 | 0.7000 | 0 |
| F12 | 1.0000 | 0.8000 | 0.8000 | 0.8000 | 0.9000 | 0.8000 | 0.9000 | 0.9000 | 0 | 0 | 0 |
| F13 | 1.0000 | 0.8000 | 0.8000 | 0 | 0 | 0 | 0.8000 | 0 | 0 | 0 | 0 |
| F14 | 0 | 0 | 0 | 0 | 0 | 0 | 0 | 0 | 0 | 0 | 0 |
| F15 | 0.8000 | 0 | 0.9000 | 0.9000 | 0 | 0 | 0.9000 | 0.9000 | 0.6000 | 0.9000 | 0.9000 |
| F16 | 0 | 0 | 0 | 0 | 0 | 0 | 0 | 1.0000 | 0.7000 | 0.6000 | 0.6000 |
| F17 | 0 | 0.7000 | 0 | 0 | 0.9000 | 0.9000 | 0 | 0 | 0.7000 | 0.6000 | 0.6000 |
| F18 | 0.9000 | 0.7000 | 0 | 0.7000 | 0 | 1.0000 | 0 | 0 | 0 | 0.9000 | 0.9000 |
| F19 | 0.8000 | 0.7000 | 0.6000 | 0.7000 | 0 | 0 | 0.8000 | 0 | 1.0000 | 0.8000 | 0.8000 |
| F20 | 1.0000 | 0.8000 | 0.8000 | 0.8000 | 0.9000 | 0 | 0.8000 | 0 | 1.0000 | 0 | 0 |
| F21 | 0.7000 | 0 | 0 | 0 | 0.9000 | 0 | 0.6000 | 0.9000 | 0 | 0 | 0 |
| F22 | 0 | 0.7000 | 0.8000 | 0 | 0.6000 | 0 | 0 | 0 | 0 | 0 | 0 |
| F23 | 0.9000 | 0 | 0 | 0 | 0 | 0.8000 | 0.8000 | 0 | 0.9000 | 0.9000 | 0.9000 |
| F24 | 0.9000 | 0 | 0 | 0.9000 | 0 | 0 | 0 | 0.7000 | 0.9000 | 0.8000 | 0 |
| F25 | 0.7000 | 0 | 0.9000 | 0 | 0.9000 | 0 | 0 | 0 | 0 | 0 | 0 |

FIG. 5D

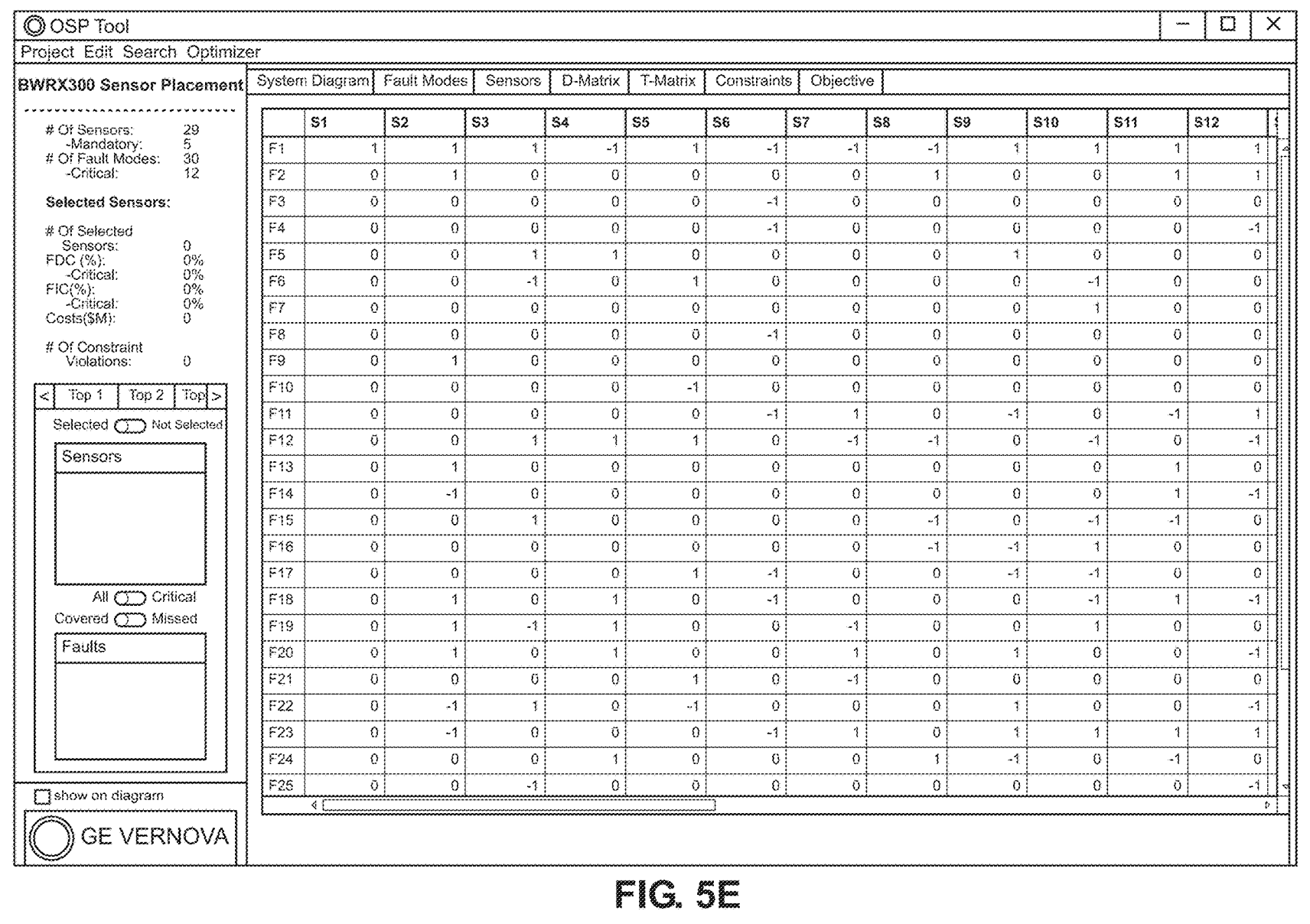

◎ OSP Tool　　　　　　　　　　　　　　　　　　　　　－ □ ✕

Project Edit Search Optimizer

BWRX300 Sensor Placement　| System Diagram | Fault Modes | Sensors | D-Matrix | T-Matrix | Constraints | Objective |

Of Sensors: 29
　-Mandatory: 5
Of Fault Modes: 30
　-Critical: 12

Selected Sensors:

Of Selected
　Sensors: 0
FDC (%): 0%
　-Critical: 0%
FIC(%): 0%
　-Critical: 0%
Costs($M): 0

Of Constraint
　Violations: 0

| Top 1 | Top 2 | Top | > |

Selected ◯ Not Selected

Sensors

All ◯ Critical
Covered ◯ Missed

Faults

☐ show on diagram

◯ GE VERNOVA

|     | S1 | S2 | S3 | S4 | S5 | S6 | S7 | S8 | S9 | S10 | S11 | S12 |
|-----|----|----|----|----|----|----|----|----|----|-----|-----|-----|
| F1  | 1  | 1  | 1  | 1  | -1 | 1  | -1 | -1 | -1 | 1   | 1   | 1   |
| F2  | 0  | 0  | 1  | 0  | 0  | 0  | 0  | 0  | 1  | 0   | 1   | 1   |
| F3  | 0  | 0  | 0  | 0  | 0  | 0  | -1 | 0  | 0  | 0   | 0   | 0   |
| F4  | 0  | 0  | 0  | 0  | 0  | 0  | 0  | 0  | 0  | 0   | 0   | -1  |
| F5  | 0  | 0  | 0  | 1  | 1  | 1  | 0  | 0  | 1  | 1   | 0   | 0   |
| F6  | 0  | 0  | -1 | 0  | 0  | 0  | 0  | 0  | 0  | 0   | -1  | 0   |
| F7  | 0  | 0  | 0  | 0  | 0  | 0  | 0  | 0  | -1 | 0   | 1   | 0   |
| F8  | 0  | 0  | 0  | 0  | 0  | 0  | -1 | 0  | 0  | 0   | 0   | 0   |
| F9  | 0  | 1  | 0  | 0  | 0  | 0  | 0  | 0  | 0  | 0   | 0   | 0   |
| F10 | 0  | 0  | 0  | 0  | 0  | -1 | 0  | 0  | 0  | -1  | 0   | 1   |
| F11 | 0  | 0  | 0  | 1  | 0  | 0  | -1 | 1  | 0  | 0   | -1  | -1  |
| F12 | 0  | 0  | 0  | 0  | 1  | 0  | 0  | -1 | -1 | 0   | 1   | 0   |
| F13 | 0  | 1  | 0  | 0  | 0  | 0  | 0  | 0  | 0  | -1  | 0   | -1  |
| F14 | 0  | -1 | 0  | 0  | 0  | 1  | 0  | 0  | 0  | 1   | 0   | 0   |
| F15 | 0  | 0  | 1  | 0  | 0  | 0  | 0  | 0  | -1 | 0   | -1  | 0   |
| F16 | 0  | 0  | 0  | -1 | 0  | 0  | 0  | 0  | -1 | -1  | 1   | 0   |
| F17 | 0  | 1  | 0  | 0  | 0  | 1  | 1  | 0  | 0  | 0   | -1  | 0   |
| F18 | 0  | 1  | 0  | 0  | 1  | 0  | -1 | 1  | 0  | 0   | 0   | 0   |
| F19 | 0  | 1  | -1 | 0  | 1  | 0  | 0  | -1 | 0  | 1   | 0   | -1  |
| F20 | 0  | 0  | 0  | 0  | 0  | 0  | 0  | 1  | 0  | 0   | 0   | 0   |
| F21 | 0  | -1 | 0  | 1  | 0  | 1  | 0  | -1 | 1  | 1   | 0   | -1  |
| F22 | 0  | -1 | 0  | 0  | 1  | -1 | 1  | 0  | 0  | -1  | 0   | 0   |
| F23 | 0  | -1 | -1 | 0  | 0  | 0  | 0  | 0  | 0  | 0   | 0   | 0   |
| F24 | 0  | 0  | 0  | 0  | 1  | 0  | 0  | 0  | 0  | -1  | -1  | 0   |
| F25 | 0  | 0  | 0  | -1 | 0  | 0  | 0  | 0  | 0  | 0   | 0   | -1  |

FIG. 5E

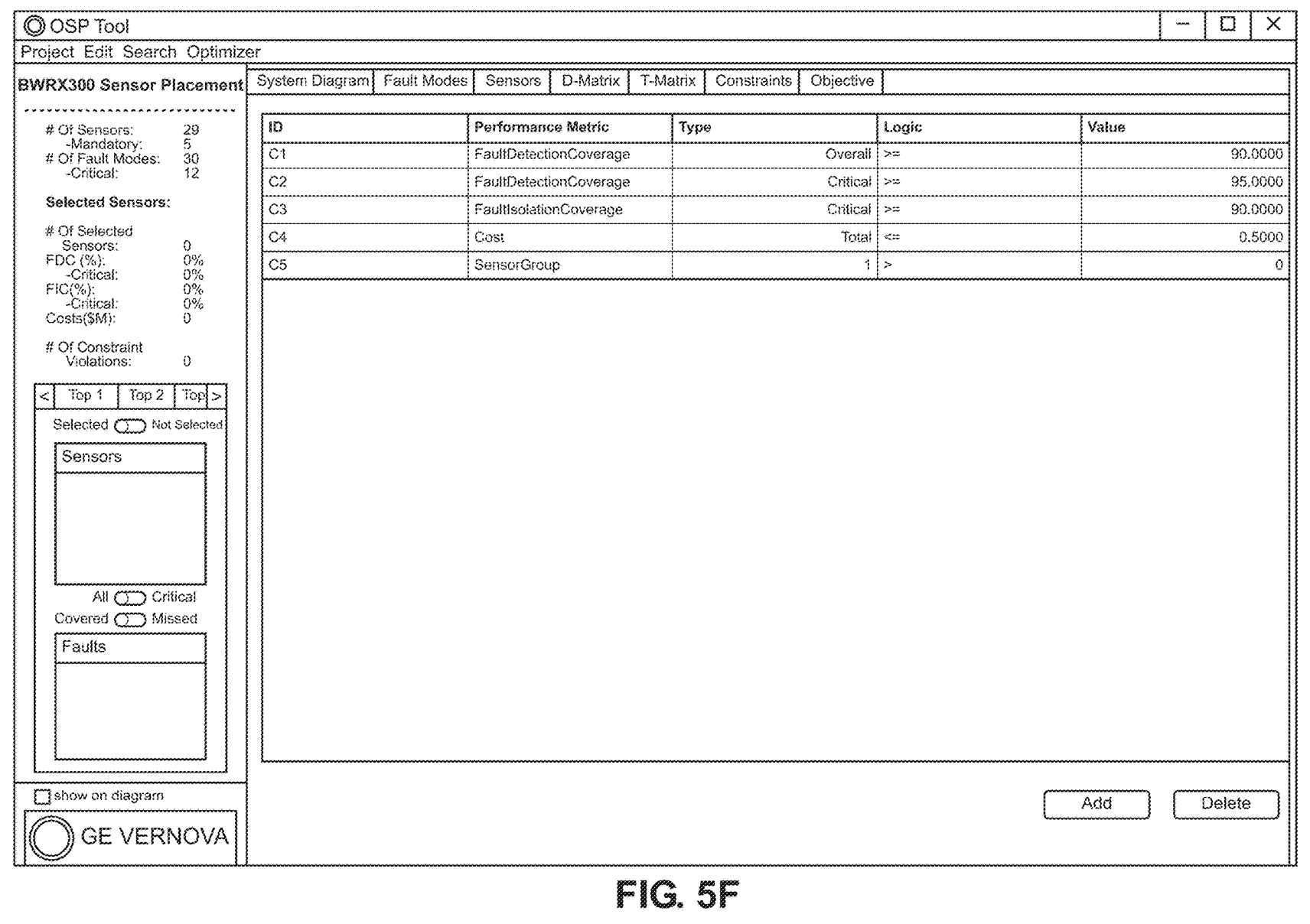

OSP Tool                                                                              — □ ✕

Project Edit Search Optimizer

BWRX300 Sensor Placement | System Diagram | Fault Modes | Sensors | D-Matrix | T-Matrix | Constraints | Objective

Of Sensors:        29
  -Mandatory:        5
Of Fault Modes:    30
  -Critical:         12

Selected Sensors:

Of Selected
Sensors:             0
FDC (%):             0%
  -Critical:         0%
FIC(%):              0%
  -Critical:         0%
Costs($M):           0

Of Constraint
Violations:          0

| ˅ | Top 1 | Top 2 | Top |> |

Selected ⊂⊃ Not Selected

Sensors

All ⊂⊃ Critical
Covered ⊂⊃ Missed

Faults

☐ show on diagram

◎ GE VERNOVA

| ID | Performance Metric | Type | Logic | Value |
|----|--------------------|------|-------|-------|
| C1 | FaultDetectionCoverage | Overall | >= | 90.0000 |
| C2 | FaultDetectionCoverage | Critical | >= | 95.0000 |
| C3 | FaultIsolationCoverage | Critical | >= | 90.0000 |
| C4 | Cost | Total | <= | 0.5000 |
| C5 | SensorGroup | 1 | > | 0 |

Add        Delete

FIG. 5F

SYSTEM AND METHOD FOR OPTIMAL SENSOR PLACEMENT

CROSS REFERENCE TO RELATED APPLICATION

This U.S. non-provisional application claims the benefit of priority under 35 USC § 119 to U.S. Provisional Application No. 63/453,557, filed on Mar. 21, 2023, in the U.S. Patent & Trademark Office, the disclosure of which is incorporated by reference herein in its entirety.

GOVERNMENT SUPPORT

This invention was made with government support under contract number DE-AR0001290, awarded by the Advanced Research Projects Agency-Energy (ARPA-e) of the U.S. Department of Energy. The U.S. government may have certain rights in the invention.

BACKGROUND

Various example embodiments relate to methods, apparatuses, systems, and/or non-transitory computer readable media for determining improved and/or optimal sensor placement for at least one object.

Complex systems and/or products, such as an airplane, a jet engine, a power plant, a nuclear reactor, etc., require a large number of sensors and/or other monitoring equipment to monitor the health and operation of the complex system. Conventionally, sensor selection is guided by process controls, regulatory requirements, and/or system health management considerations, but the study, analysis, and/or evaluation of the selected sensor suites and/or the placement of the sensor suites are typically limited and/or not performed for health management during the design and construction of the complex system, and instead may be performed after the construction of the complex system has been completed and/or the operation of the complex system has begun. Thus, the suite of sensors and/or placement of the sensor suit may be unsuitable and/or ineffective in monitoring faults and/or failures, may be ineffective in covering all faults and/or failures, and/or may fail to account for the reliability of the sensors at their particular placements and/or future maintenance costs of the sensors at their particular placements, etc. When such sub-optimal sensor selection and/or sensor placement is discovered after the fact, there may be little recourse in remedying the problem (e.g., changing the location of the sensors, changing the type of sensors, and/or adding additional sensors, etc.) and/or it may result in significant cost to improve the sensor selection and/or sensor placement, and increased costs for system recertification in case of critical systems.

SUMMARY

At least one example embodiment relates to a computing device.

In at least one example embodiment, the computing device may include a memory storing computer readable instructions, and processing circuitry configured to execute the computer readable instructions to cause the computing device to, receive a plurality of fault conditions and an initial sensor suite associated with at least one object to be simulated, the initial sensor suite including a plurality of candidate physical sensors for the at least one object, perform failure mode analysis of the initial sensor suite, the performing the failure mode analysis including generating at least one dependency-matrix (D-matrix) based on the plurality of fault conditions and the plurality of candidate physical sensors, and generate a recommended sensor suite associated with the at least one object based on results of the failure mode analysis, the recommended sensor suite including at least one recommended sensor, the at least one recommended sensor being a subset of the plurality of candidate physical sensors.

Some example embodiments provide that the at least one object is at least one of, a power plant, a turbine, a power grid, a jet engine, a factory environment, an environmental system, a HVAC system, a computational system, or any combinations thereof.

Some example embodiments provide that the processing circuitry is further configured to execute the computer readable instructions to cause the computing device to, receive a simulation file corresponding to the at least one object to be simulated, the simulation file including baseline condition data of the at least one object to be simulated and at least one fault condition data of the at least one object to be simulated, and modify the simulation file to include the at least one recommended sensor.

Some example embodiments provide that the processing circuitry is further configured to execute the computer readable instructions to cause the computing device to, display the at least one object to be simulated and the at least one recommended sensor on a display screen using the modified simulation file, the at least one recommended sensor displayed in a recommended location relative to the at least one object, the recommended location determined during the failure mode analysis.

Some example embodiments provide that the processing circuitry is further configured to execute the computer readable instructions to cause the computing device to, determine at least one virtual candidate sensor based on at least two candidate physical sensors of the plurality of candidate physical sensors, and add the at least one virtual candidate sensor to the initial sensor suite and the at least one D-matrix.

Some example embodiments provide that the processing circuitry is further configured to execute the computer readable instructions to cause the computing device to, receive information, the information including at least one of user preference information, system design preference information, sensor preference information, sensor capability information, sensor group information, sensor life-cycle cost information, fault criticality information, fault failure rate information, or any combinations thereof, determine sensor-fault condition correlation scores for each candidate physical sensor and each virtual candidate sensor included in the at least one D-matrix based on the received information, and select the at least one recommended sensor from the plurality of candidate physical sensors and the at least one virtual candidate sensor based on the determined sensor-fault condition correlation scores.

Some example embodiments provide that the processing circuitry is further configured to execute the computer readable instructions to cause the computing device to perform the failure mode analysis of the initial sensor suite by, select a plurality of test sensor suites from the plurality of candidate physical sensors and the at least one virtual candidate sensor, each of the test sensor suites being a different combination of sensors from the plurality of candidate physical sensors and the at least one virtual candidate sensor, calculate a fault detection score for each of the plurality of test sensor suites for each of the plurality of fault conditions, determine an overall fault detection coverage score of each of the plurality of fault conditions based on the calculated fault detection scores for each of the plurality of test sensor suites associated with the respective fault condition and a desired threshold fault detection coverage value associated with the respective fault condition, and select the at least one recommended sensor from the plurality of test sensor suites based on the determined overall fault detection coverage score of each of the plurality of fault conditions.

Some example embodiments provide that the processing circuitry is further configured to execute the computer readable instructions to cause the computing device to perform the failure mode analysis of the initial sensor suite by, select a plurality of test sensor suites from the plurality of candidate physical sensors and the at least one virtual candidate sensor, each of the test sensor suites being a different combination of sensors from the plurality of candidate physical sensors and the at least one virtual candidate sensor, calculate a fault isolation coverage score for each of the plurality of test sensor suites for each of the plurality of fault conditions, and select the at least one recommended sensor from the plurality of test sensor suites based on the calculated fault isolation coverage score of each of the plurality of fault conditions and a desired threshold fault isolation coverage value.

Some example embodiments provide that the processing circuitry is further configured to execute the computer readable instructions to cause the computing device to perform the failure mode analysis of the initial sensor suite by, for each candidate physical sensor and each virtual candidate sensor, simulate life-cycle costs using the respective candidate sensor for at least one physical location corresponding to the at least one object associated with each of the plurality of fault conditions based on initial sensor cost of the respective candidate sensor, maintenance cost of the respective candidate sensor, and savings from avoidance of the respective fault condition, determine sensor-fault condition correlation scores for the plurality of candidate sensors for the at least one physical location based on the simulated life-cycle costs, and select the at least one recommended sensor from the plurality of candidate physical sensors and the at least one virtual candidate sensor based on the determined sensor-fault condition correlation scores.

Some example embodiments provide that the processing circuitry is further configured to execute the computer readable instructions to cause the computing device to, for each candidate physical sensor and each virtual candidate sensor, generate balanced baseline conditions simulation data for baseline conditions for the respective sensor, generate balanced fault condition simulation data for each fault condition for the respective sensor, and determine sensor-fault condition correlation score for the respective sensor based on the generated balanced baseline conditions simulation data and the generated balanced fault condition simulation data, and select the at least one recommended sensor from the plurality of candidate physical sensors and the at least one virtual candidate sensor based on the determined sensor-fault condition correlation scores.

At least one example embodiment relates to a method of operating a computing device.

In at least one example embodiment, the method may include, receiving a plurality of fault conditions and an initial sensor suite associated with at least one object to be simulated, the initial sensor suite including a plurality of candidate physical sensors for the at least one object, performing failure mode analysis of the initial sensor suite, the performing the failure mode analysis including generating at least one dependency-matrix (D-matrix) based on the plurality of fault conditions and the plurality of candidate physical sensors, and generating a recommended sensor suite associated with the at least one object based on results of the failure mode analysis, the recommended sensor suite including at least one recommended sensor, the at least one recommended sensor being a subset of the plurality of candidate physical sensors.

Some example embodiments provide that the at least one object is at least one of, a power plant, a turbine, a power grid, a jet engine, a factory environment, an environmental system, a HVAC system, a computational system, or any combinations thereof, and the method may further include receiving a simulation file corresponding to the at least one object to be simulated, the simulation file including baseline condition data of the at least one object to be simulated and at least one fault condition data of the at least one object to be simulated, modifying the simulation file to include the at least one recommended sensor, and displaying the at least one object to be simulated and the at least one recommended sensor on a display screen using the modified simulation file, the at least one recommended sensor displayed in a recommended location relative to the at least one object, the recommended location determined during the failure mode analysis.

Some example embodiments provide that the method may further include, determining at least one virtual candidate sensor based on at least two candidate physical sensors of the plurality of candidate physical sensors, and adding the at least one virtual candidate sensor to the initial sensor suite and the at least one D-matrix.

Some example embodiments provide that the method may further include, receiving information, the information including at least one of user preference information, system design preference information, sensor preference information, sensor capability information, sensor group information, sensor life-cycle cost information, fault criticality information, fault failure rate information, or any combinations thereof, determining sensor-fault condition correlation scores for each candidate physical sensor and each virtual candidate sensor included in the at least one D-matrix based on the received information, and selecting the at least one recommended sensor from the plurality of candidate physical sensors and the at least one virtual candidate sensor based on the determined sensor-fault condition correlation scores.

Some example embodiments provide that the may further include, selecting a plurality of test sensor suites from the plurality of candidate physical sensors and the at least one virtual candidate sensor, each of the test sensor suites being a different combination of sensors from the plurality of candidate physical sensors and the at least one virtual candidate sensor, calculating a fault detection score for each of the plurality of test sensor suites for each of the plurality of fault conditions, determining an overall fault detection coverage score of each of the plurality of fault conditions based on the calculated fault detection scores for each of the plurality of test sensor suites associated with the respective fault condition and a desired threshold fault detection coverage value associated with the respective fault condition, and selecting the at least one recommended sensor from the plurality of test sensor suites based on the determined overall fault detection coverage score of each of the plurality of fault conditions.

Some example embodiments provide that the method may further include, selecting a plurality of test sensor suites from the plurality of candidate physical sensors and the at least one virtual candidate sensor, each of the test sensor suites being a different combination of sensors from the plurality of candidate physical sensors and the at least one virtual candidate sensor, calculating a fault isolation coverage score for each of the plurality of test sensor suites for each of the plurality of fault conditions, and selecting the at least one recommended sensor from the plurality of test sensor suites based on the calculated fault isolation coverage score of each of the plurality of fault conditions and a desired threshold fault isolation coverage value.

Some example embodiments provide that the method may further include, for each candidate physical sensor and each virtual candidate sensor, simulating life-cycle costs using the respective candidate sensor for at least one physical location corresponding to the at least one object associated with each of the plurality of fault conditions based on initial sensor cost of the respective candidate sensor, maintenance cost of the respective candidate sensor, and savings from avoidance of the respective fault condition, determining sensor-fault condition correlation scores for the plurality of candidate sensors for the at least one physical location based on the simulated life-cycle costs, and selecting the at least one recommended sensor from the plurality of candidate physical sensors and the at least one virtual candidate sensor based on the determined sensor-fault condition correlation scores.

Some example embodiments provide that the method may further include, for each candidate physical sensor and each virtual candidate sensor, generating balanced baseline conditions simulation data for baseline conditions for the respective sensor, generating balanced fault condition simulation data for each fault condition for the respective sensor, and determining sensor-fault condition correlation score for the respective sensor based on the generated balanced baseline conditions simulation data and the generated balanced fault condition simulation data, and selecting the at least one recommended sensor from the plurality of candidate physical sensors and the at least one virtual candidate sensor based on the determined sensor-fault condition correlation scores.

At least one example embodiment relates to a non-transitory computer readable medium storing computer readable instructions.

In at least one example embodiment, the computer readable instructions, which when executed by processing circuitry of a computing device, may cause the computing device to, receive a plurality of fault conditions and an initial sensor suite associated with at least one object to be simulated, the initial sensor suite including a plurality of candidate physical sensors for the at least one object, perform failure mode analysis of the initial sensor suite, the performing the failure mode analysis including generating at least one dependency-matrix (D-matrix) based on the plurality of fault conditions and the plurality of candidate physical sensors, and generate a recommended sensor suite associated with the at least one object based on results of the failure mode analysis, the recommended sensor suite including at least one recommended sensor, the at least one recommended sensor being a subset of the plurality of candidate physical sensors.

Some example embodiments provide that the computing device may be further caused to, receive information, the information including at least one of user preference information, system design preference information, sensor preference information, sensor capability information, sensor group information, sensor life-cycle cost information, fault criticality information, fault failure rate information, or any combinations thereof, determine sensor-fault condition correlation scores for each candidate physical sensor included in the at least one D-matrix based on the received information, and select the at least one recommended sensor from the plurality of candidate physical sensors and the at least one virtual candidate sensor based on the determined sensor-fault mode correlation scores.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIGS. 4A to 4E illustrate example dependency-matrix tables and data graphs according to some example embodiments; and FIGS. 5A to 5F illustrate example graphical user interface (GUI) screens associated with a software application for generating sensor design recommendations according to some example embodiments.

DETAILED DESCRIPTION

Figure 1:
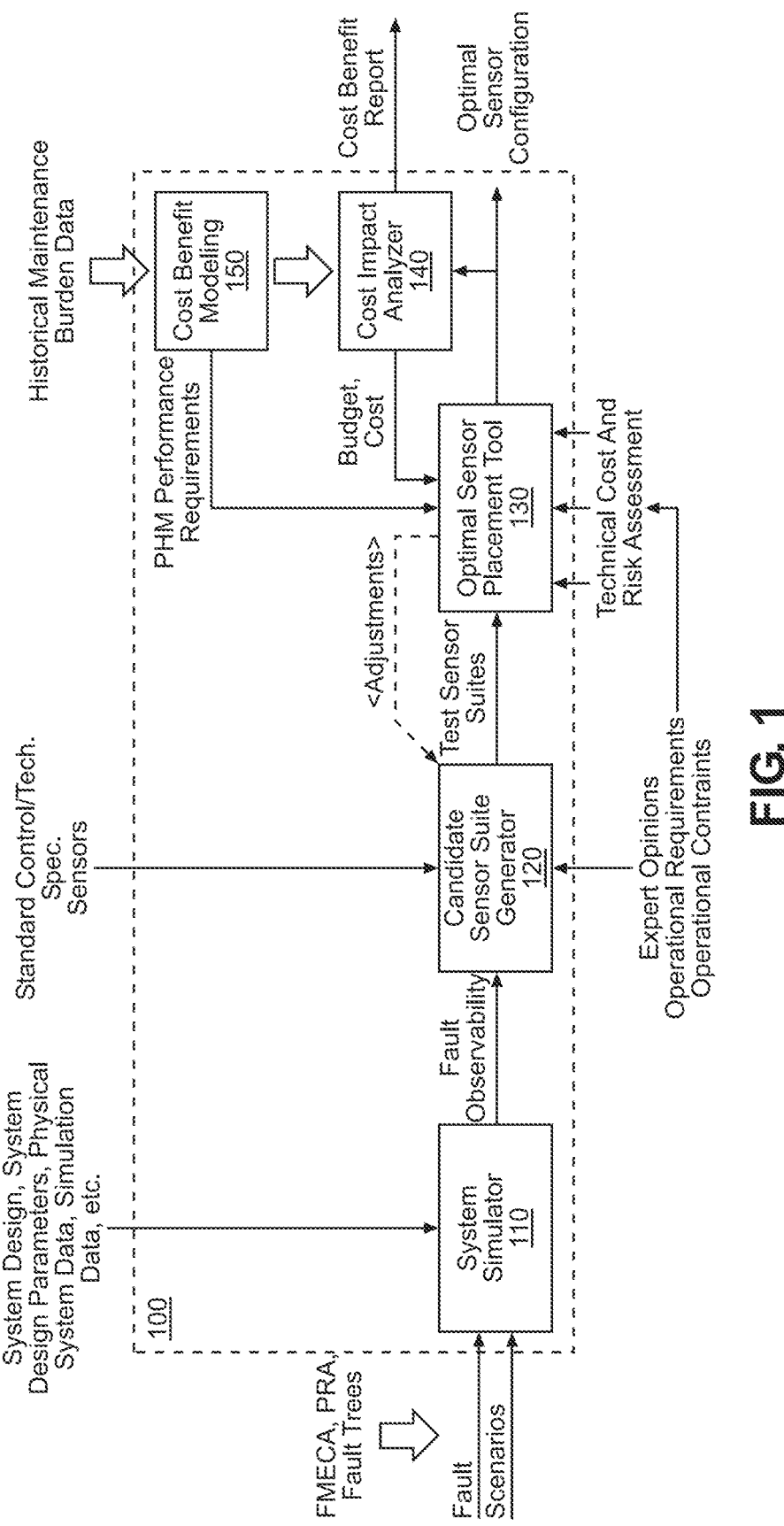
FIG. 1 illustrates a functional block diagram of an example sensor design recommendation system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment is directed to methods, apparatuses, systems, and/or non-transitory computer readable media for determining improved and/or optimal sensor placement for at least one complex object, complex product, and/or complex system (hereinafter collectively referred to as an object and/or complex object). Examples of complex objects may include a power plant, a nuclear reactor, a turbine, a power grid, an engine, a motor, a jet engine, a factory environment, an environmental system, a vehicle (e.g., automobile, aircraft, helicopter, drone, boat/ship, naval vessel, spacecraft, a heating ventilation and air condition (HVAC) system, a computational system, a computer network, and/or other objects, products, and/or systems, which include a plurality of sensors for monitoring the health and/or operation of the object, product, and/or system. The operation of complex objects and/or health monitoring of complex objects typically require (and/or desire) a suite of sensors to be placed at desired locations to provide system functions and/or health monitoring, etc. The sensors may be used for diagnosing and/or prognosticating failures of the complex object, and thereby may reduce the downtime of the object, reduce the maintenance costs of the object, and/or help reduce and/or avoid damage and/or catastrophic failure of the complex object, etc. The selection of the suite of sensors and/or the placement of the selected suite of sensors typically occurs during the Prognostics and Health Management (PHM) portion of the design phase of the complex object.

However, the PHM process typically is a manual process performed by the object design team and often faces time and cost limitations, which results in sub-optimal sensor selection and/or sensor placement, etc., which may lead to decreased and/or missing coverage of faults and/or failures of the complex object, inefficient coverage of faults (e.g., unnecessary, redundant coverage of a fault, sub-optimal coverage of the fault, etc.), increased construction costs due to sub-optimal selection of a sensor over a cheaper alternative, increased maintenance costs for the sensors and/or increased failure rates of the sensors due to sub-optimal placement of the sensors, etc.

Accordingly, there is a desire and/or need for methods, apparatuses, systems, and/or non-transitory computer readable media are disclosed which provide improved sensor placement recommendations with respect to a Prognostics and Health Management (PHM) design for complex objects, such that fault modes and/or conditions of the object may be monitored to avoid catastrophic consequence, reduce system Operation and Maintenance (O&M) costs, improve PHM capabilities, and/or reduce maintenance costs, etc. There is a further desire and/or need to improve PHM processes and/or sensor recommendations by providing automated integration of PHM requirements, such as fault detection and/or fault isolation coverages, into the sensor selection and/or sensor placement process, integrating input and/or analysis from multi-disciplinary teams, computer simulation data, and/or historical data, during the sensor selection and/or sensor placement recommendations for the complex object design, providing integrated and/or systematic evaluation of sensors (as opposed to evaluation of individual sensors as found in conventional PHM processes), including providing virtual sensor group recommendations for the complex object design, and/or providing cost-benefit analysis for the recommended sensor suite which include providing maintenance costs projections related to the recommended sensor suite, etc.

FIG. 1 illustrates a functional block diagram of an example sensor design recommendation system according to at least one example embodiment.

As shown in FIG. 1, the sensor design recommendation system includes at least one computing device 100 (e.g., a personal computer, a laptop, a workstation, a server, a mobile device, a tablet, etc.), but the example embodiments are not limited thereto, and the example embodiments may include a greater or lesser number of constituent elements. According to at least one example embodiment, the at least one computing device 100 may be connected to a network (not shown) and may receive input from at least one additional computing device (not shown) over the network. For example, the at least one computing device 100 may be a server (and/or cloud server, etc.) which provides the sensor design recommendation as a cloud service, as a machine learning as a service (MLaaS), etc., which receives inputs from one or more additional computing device acting as design workstations, developer personal computers, etc., but the example embodiments are not limited thereto. According to at least one example embodiment, the computing device

100 may receive input directly from the user using an input/output device, e.g., a keyboard, mouse, etc., but is not limited thereto.

According to at least one example embodiment, the computing device 100 may host and/or provide functionality associated with the sensor design recommendation system, such as providing a graphical user interface (GUI) which allows designers to create, generate, upload, edit, and/or modify complex object designs to the computing device 100, allows complex object designers, subject matter experts (SMEs), e.g., scientists, engineers, installers, vendors, etc., to provide inputs and/or analysis regarding the complex object design, etc., and/or generates, displays, and/or outputs sensor design recommendations, modifications to the complex object design, one or more reports, such as cost-benefit reports, etc., but the example embodiments are not limited thereto.

According to at least one example embodiment, the computing device 100 may include a system simulator 110, a candidate sensor suite generator 120, an optimal sensor placement tool 130, a cost impact analyzer 140, and/or a cost-benefit modeler 150, etc., but the example embodiments are not limited thereto, and for example, the computing device 100 may include a greater or lesser number of constituent components, etc. While FIG. 1 illustrates a single computing device 100 including the system simulator 110, the candidate sensor suite generator 120, the optimal sensor placement tool 130, the cost impact analyzer 140, and/or the cost-benefit modeler 150, etc., the example embodiments are not limited thereto, and for example, the computing device 100 may be a plurality of computing devices 100 interconnected and/or network together, and each of the plurality of computing devices may include one or more of the sub-components of the computing device 100 shown in FIG. 1, etc. Additionally, according to some example embodiments, the functionality of two or more sub-components of the computing device 100 may be performed by a single sub-component and/or the functionality of a single sub-component may be performed by a plurality sub-sub-components, etc.

The system simulator 110 may receive a plurality of inputs related to the complex object design, the system design parameters, and/or fault scenarios associated with the complex object, etc. For example, the system simulator 110 may receive data and/or files corresponding to the design of the complex object (e.g., CAD file, blueprint, markup document, MATLAB code, software source code, etc.), desired and/or required design parameters associated with the complex object, fault scenario information, such as failure modes, effect, and criticality analysis (FMECA) information, probabilistic risk assessment (PRA) output, fault trees, etc., but the example embodiments are not limited thereto.

FMECA refers to a measure of the impact a giving failure mode has compared to other failure modes in the functioning and/or critical functioning of a complex object (e.g., a system). For example a bearing failure could result in extended damage to the complex object, whereas condenser fouling, which may result in degraded performance, has less of an impact on the rest of the complex object then the bearing failure. PRA output refers to a systematic method for assessing questions that an entity, such as the Nuclear Regulatory Commission (NRC), uses to define "risk." For the NRC, these questions may consider: (1) what may go wrong with a complex object; (2) how likely such problems and/or failures may occur; and (3) what the consequences of the problem and/or failure might be. Fault tree analysis refers to a method of analyzing and/or understanding how complex objects may fail, and to identify ways to reduce the failure risk and/or to determine such failure rates.

Additionally, the system simulator 110 may also receive physical system data associated with the complex object, such as historical (and/or real-world) data collected regarding the complex object being designed, historical data collected regarding similar and/or previous complex objects (e.g., prototypes of the complex object, earlier versions/models of the complex object, competing complex objects, etc.), and/or simulation data, e.g., environmental data (e.g., expected operating temperatures of the complex object, etc.), but is not limited thereto. The system simulator 110 may use the received system design of the complex object, system design parameters, physical system data, and fault scenarios to perform at least one simulation of the system design and to generate, identify, and/or determine fault observability information regarding the complex object, which refers to how easily a given fault is detected and/or observed in the complex object using existing sensor data.

The candidate sensor suite generator 120 may receive the fault observability information from the system simulator 110 and may also receive sensor information associated with a plurality of candidate sensors for potential use and/or for evaluation for the complex object design. The sensor information may include sensor type information, sensor technical specification information from the manufacturer (e.g., sensor capability information, sensor sensitivity information, sensor range information, etc.), sensor life-cycle cost information (which may be a combination of direct sensor cost information (e.g., purchase cost, harness cost, installation cost, sensor communication cost, processing cost, other capital costs, etc.), and sensor maintenance information (e.g., expected costs for operating the sensor, expected costs for inspecting/maintaining/servicing/repairing the sensor, sensor disassembly cost, sensor replacement cost, other labor cost, and productivity loss cost due to sensor maintenance and/or failure, expected sensor lifetime information, sensor reliability and/or sensor failure rate information, etc.)), etc., for each of the candidate sensors. Further, the candidate sensor suite generator 120 may also receive inputs related to operational requirements (e.g., fault criticality information (e.g., priority information for each fault), mandatory sensors (e.g., sensors desired and/or required for regulatory requirements, for certification requirements, for design requirements, for control requirements, etc.), redundancy requirements, up-time requirements, etc.) for the sensors of the complex object, operational constraints for the sensors of the complex object, etc. Operational requirements and constraints may include, for example, certain sensor readings which are only valid when fluid is moving through the complex object, but are not accurate when a certain valve is shut thereby blocking fluid movement, etc., but are not limited thereto. SME expert opinions related to the candidate sensors, etc. According to some example embodiments, the inputs may be provided to the system simulator 110 and/or computing device 100 as manual inputs via a GUI to the system simulator 110 and/or via configuration files, such as JSON files, XML files, etc., but the example embodiments are not limited thereto.

The candidate sensor suite generator 120 will then generate at least one test sensor suite (e.g., an initial sensor suite, candidate sensor suite, etc.) including at least one test candidate sensor from the plurality of candidate sensors for the complex object based on the sensor information, fault observability information, expert opinions, operational requirements, and/or operational constraints, etc., but the example embodiments are not limited thereto. For example, the candidate sensor suite generator 120 will filter the plurality of candidate sensors to determine one or more test candidate sensors which will satisfy one or more of the fault conditions, fault coverage requirements, the operational requirements, operational constraints, etc., based on the sensor information, SME expert opinions, simulation data, physical system data, etc. Additionally, the candidate sensor suite generator 120 may generate test sensor location recommendations for the one or more test sensors based on the sensor information, SME expert opinions, simulation data, physical system data, etc. Moreover, the candidate sensor suite generator 120 may generate one or more virtual sensor candidates (and/or virtual sensor groups, candidate sensor groups, etc.) which may be a group of two or more physical sensors configured to detect, sense, monitor, etc., one or more fault conditions, etc. According to at least one example embodiment, the two or more physical sensors of a virtual sensor group may linked together via a configuration setting and/or a programmatic algorithm may be executed in association with the two or more physical sensors to link the two or more physical sensors in order to provide improved fault detection performance, improved fault isolation performance, and/or improved cost-benefit performance, etc., but the example embodiments are not limited thereto.

For example, the candidate sensor suite generator 120 may generate a virtual sensor candidate which includes two low cost physical sensors with relatively lower sensitivity, fidelity, and/or reliability for detecting a pipe blockage placed at different locations of the pipe may provide better performance than a single high cost physical sensor relatively higher sensitivity, fidelity and/or reliability than either of the two low cost sensors, etc. The generation of the test senor suite will be discussed in greater detail in connection with FIGS. 3A-3B and 4A to 4E, etc.

Next, the optimal sensor placement tool 130 receives the test sensor suite from the candidate sensor suite generator 120, as well as PHM performance metrics and/or requirement information (e.g., fault coverage requirements, false alert rate metrics, true detection rate metrics, etc.), technical cost and risk assessment information (for example, how adding a certain sensor may affect flow, and thus impose a technical cost for flow rate and possible risk of obstruction under certain failure modes, technical costs of maintaining the added sensor over its lifetime and the risks from incorrect sensing if the certain sensor itself fails resulting in false detection, e.g., the additional cost of unnecessary inspection/maintenance and/or the additional costs incurred from missed detection of failures and/or missed detection of an increased risk of failure, etc.), budget information and/or cost information (e.g., purchase price of the sensor, cost of installing the sensor, cost of maintaining the sensor, etc.), but the example embodiments are not limited thereto. According to at least one example embodiment, the optimal sensor placement tool 130 may optionally receive the SME expert opinion information, the operational requirement information, and/or the operational constraints information, in addition to or instead of the candidate sensor suite generator 120. The optimal sensor placement tool 130 may use the received information and perform failure mode analysis of the test sensor suite to generate a recommended sensor suite configuration (e.g., improved and/or optimal sensor configuration, etc.), including performing dependency-matrix (D-matrix) analysis of the test sensor suite using the fault condition information, the PHM performance requirement information, technical cost and risk assessment information, budget information and/or cost information, etc., but the example embodiments are not limited thereto. For example, the optimal sensor placement tool 130 may evaluate each of the test candidate sensors of the test sensor suite at desired test locations of the complex object against each failure condition (e.g., failure modes, fault scenarios, etc.) included in the FMECA study, PRA, fault trees, etc., to determine a sensor-fault condition score (e.g., a probability and/or confidence, etc.) for each test candidate sensor-fault condition combination to determine the suitability of the test candidate sensor in detecting and/or monitoring the fault condition. The optimal sensor placement tool 130 may further determine an overall fault detection coverage score for the test sensor suite and/or one or more subsets of the test sensor suite (e.g., different combinations of test sensors included in the test sensor suite) all of the received fault conditions at the respective recommended test sensor locations and determine whether the test sensor suite (and/or subsets of the test sensor suite) meets and/or exceeds desired fault detection coverage threshold values included in the PHM performance requirements.

The optimal sensor placement tool 130 may further transmit the test sensor suite to the cost impact analyzer 140 to calculate the costs (e.g., purchase cost, installation cost, maintenance cost, repair cost, failure rate, criticality value, etc.) of the test sensor suite (and/or subsets of the test sensor suite) based on a cost-benefit modeling performed by the cost-benefit modeler 150 and compare it to the desired budget for the sensor suite of the complex object, but the example embodiments are not limited thereto. For example, the cost-benefit modeler 150 may receive historical maintenance burden data associated with the candidate sensors included in the test sensor suite, sensor failure rate data, sensor false alert data, etc., and model the cost-benefit of the test sensor suite. In some example embodiments, the cost impact analyzer 140 and the cost-benefit modeler 150 may be combined.

The cost impact analyzer 140 may then return the cost information associated with the test sensor suite to the optimal sensor placement tool 130 and the optimal sensor placement tool 130 may determine whether the test sensor suite (and/or subsets of the test sensor suite) meets the minimum thresholds for fault detection coverage and budget thresholds. If the fault detection coverage threshold and budget threshold are met, the optimal sensor placement tool 130 may store and/or include the test sensor suite in a list of viable test sensor suites.

The optimal sensor placement tool 130 will transmit the results of the evaluation of the test sensor suite to the candidate sensor suite generator 120 and the candidate sensor suite generator 120 will generate a new test sensor suite based on the results of the evaluation. For example, if the test sensor suite did not meet the fault detection coverage threshold for a certain fault condition during the evaluation and/or simulation, the candidate sensor suite generator 120 may replace the failed test candidate sensor(s) with a different candidate sensor and/or groups of candidate sensors suitable for detecting the certain fault condition, etc. Additionally, the candidate sensor suite generator 120 may adjust the recommended test location of the failed test candidate sensor(s) if the fault detection coverage score of the failed test candidate sensor(s) was above a minimum fault detection coverage threshold value (e.g., a second fault detection coverage threshold value), etc.

Moreover, the candidate sensor suite generator 120 may also replace a test candidate sensor(s) with a different candidate sensor and/or groups of candidate sensors if the test candidate sensor(s) failed the desired budgetary limits for the fault condition, even if the test candidate sensor(s)

met the fault detection coverage threshold. In this case, the candidate sensor suite generator 120 may identify a replacement test candidate sensor (and/or a group of replacement test candidate sensors) which are less expensive than the original test candidate sensor but still designed to detect and/or monitor the fault condition. Once the new test sensor suite has been generated, the candidate sensor suite generator 120 may transmit the new test sensor suite to the optimal sensor placement tool 130 for evaluation. Assuming that the new test sensor suite meets and/or exceeds the fault detection coverage threshold value and the budget thresholds, the new test sensor suite may be added to the list of viable test sensor suites.

Once all combinations of candidate sensor suites have been generated by the candidate sensor suite generator 120 and evaluated by the optimal sensor placement tool 130, the optimal sensor placement tool 130 may compare each viable test sensor suite included in the list of viable test sensor suites to determine a recommended sensor suite (e.g., an optimal sensor configuration, an improved sensor configuration, etc.) based on the PHM performance metrics and/or cost-benefit metrics, etc. For example, the optimal sensor placement tool 130 may determine the viable test sensor suite which provides the highest fault detection coverage at the lowest total cost and output the recommended test suite based on the results of the determination, etc., but the example embodiments are not limited thereto. The recommended sensor suite may be output to an external device, e.g., the designer workstation, etc., may be displayed on the GUI of the sensor design recommendation system, etc. Additionally, the optimal sensor placement tool 130 may modify the original design file of the complex object to include the recommended sensor suite and the recommended locations of the recommended sensor suite, etc., and the modified design file may be transmitted, for example, to the system simulator 110 for further simulating, testing, modeling, designing, etc.

The optimal sensor placement tool 130 may also transmit the recommended sensor suite to the cost impact analyzer 140 and the cost impact analyzer 140 may generate a cost-benefit report regarding the recommended sensor suite based on the calculated costs for the recommended sensor suite, etc. Additionally, the cost impact analyzer 140 may include the cost information for one or more of the non-selected viable sensor suites for comparison purposes, etc.

The performance of the failure mode analysis, generation of the recommended sensor suite configuration, cost-benefit modeling, etc., will be discussed in greater detail in connection with FIGS. 3A-3B and 4A to 4E, etc.

While certain components of a sensor design recommendation system are shown in FIG. 1, the example embodiments are not limited thereto, and the system may include components other than that shown in FIG. 1, which are desired, necessary, and/or beneficial for operation of the system, etc.

Figure 2:
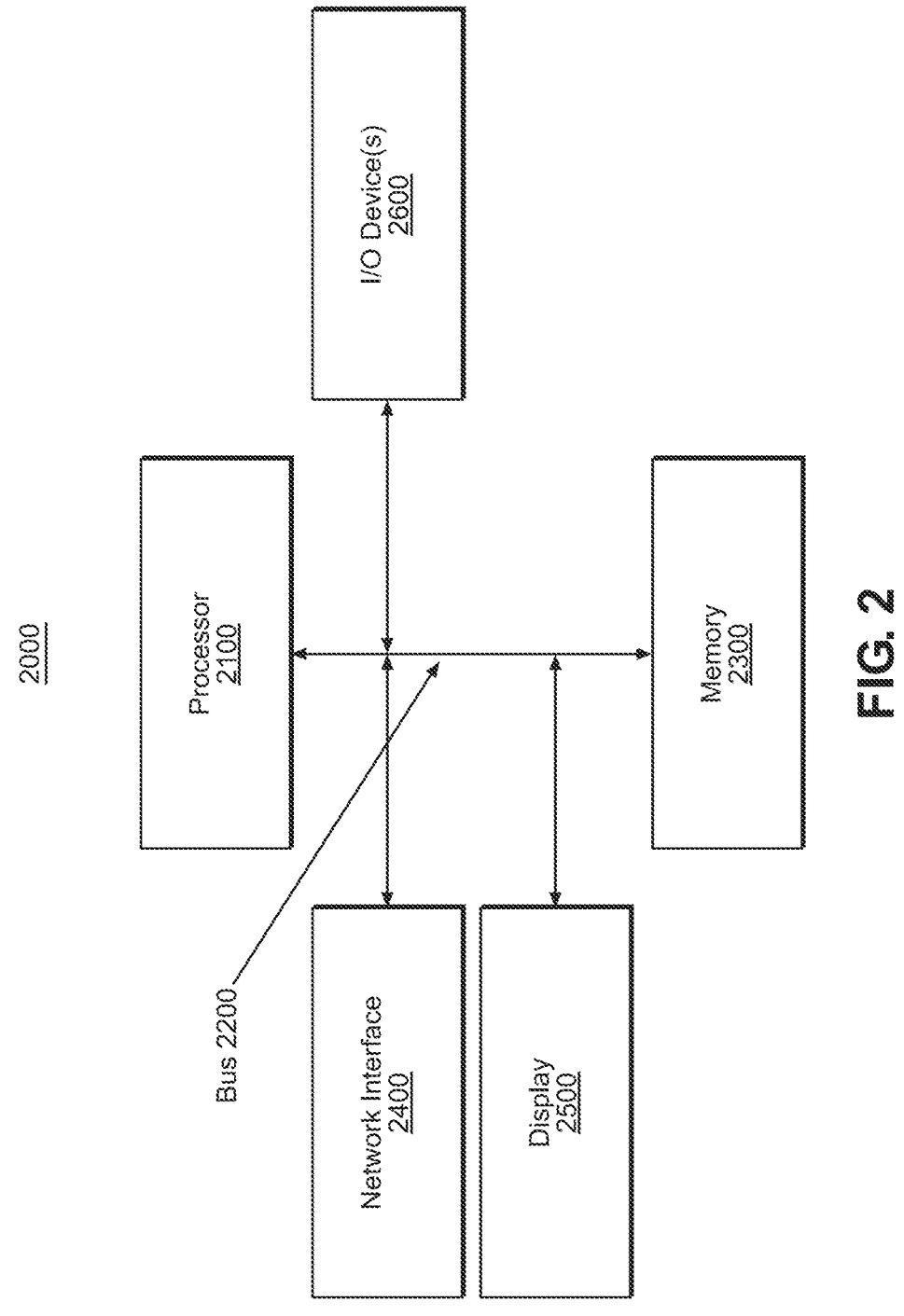
FIG. 2 illustrates a block diagram of an example computing device associated with the sensor design recommendation system according to at least one example embodiment.

FIG. 2 illustrates a block diagram of an example computing device associated with the sensor design recommendation system according to at least one example embodiment. The computing device 2000 of FIG. 2 may correspond to the computing device 100 of FIG. 1, but the example embodiments are not limited thereto.

Referring to FIG. 2, a computing device 2000 may include processing circuitry, such as the at least one processor 2100, at least one communication bus 2200, a memory 2300, at least one network interface 2400, and/or at least one input/output (I/O) device 2600 (e.g., a keyboard, a touchscreen, a mouse, a microphone, a speaker, a scanner, a printer, etc.), etc., but the example embodiments are not limited thereto. For example, the computing device 2000 may further include a display panel 2500, such as a monitor, a touchscreen, etc., and/or a camera for capturing images, videos, etc. The memory 2300 may include various special purpose program code including computer executable instructions which may cause the computing device 2000 to perform one or more of the methods of the example embodiments, including but not limited to computer executable instructions related to generating a complex object system design file, editing and/or modifying the complex object system design file, simulating the complex object based on the design file, physical system data, and/or simulation data, performing failure mode analysis of candidate sensor suites, performing cost-benefit modeling of candidate sensor suites, etc., but the example embodiments are not limited thereto.

In at least one example embodiment, the processing circuitry may include at least one processor (and/or processor cores, distributed processors, networked processors, etc.), such as the at least one processor 2100, which may be configured to control one or more elements of the computing device 2000, and thereby cause the computing device 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire computing device 2000. Once the special purpose program instructions are loaded into, (e.g., the at least one processor 2100, etc.), the at least one processor 2100 executes the special purpose program instructions, thereby transforming the at least one processor 2100 into a special purpose processor and/or special purpose processing circuitry.

In at least one example embodiment, the memory 2300 may be a non-transitory computer-readable storage medium and may include a random access memory (RAM), a read only memory (ROM), and/or a permanent mass storage device, such as a disk drive and/or a solid state drive, etc. Stored in the memory 2300 is program code (i.e., computer readable instructions) related to generating a complex object system design file, editing and/or modifying the complex object system design file, simulating the complex object based on the design file, physical system data, and/or simulation data, performing failure mode analysis of candidate sensor suites, performing cost-benefit modeling of candidate sensor suites, etc., such as the methods discussed in connection with FIGS. 3A to 5F, the at least one network interface 2400, and/or at least one I/O device 2600, etc. Such software elements may be loaded from a non-transitory computer-readable storage medium independent of the memory 2300, using a drive mechanism (not shown) connected to the computing device 2000, or via the at least one network interface 2400, and/or at least one I/O device 2600, etc.

In at least one example embodiment, the at least one communication bus 2200 may enable communication and/or data transmission to be performed between elements of the computing device 2000. The bus 2200 may be implemented using a high-speed serial bus, a parallel bus, and/or any other appropriate communication technology. According to some example embodiments, the computing device 2000 may include a plurality of communication buses (not shown).

Additionally, the computing device 2000 may also perform the simulation of the complex object, the failure mode analysis of candidate sensor suites, and/or cost-benefit modeling of candidate sensor suites, etc., using at least one trained machine learning algorithm and/or trained neural network, such as random forests algorithm, support vector machines, logistic regression, etc. For example, the machine learning algorithm and/or neural network may be trained on a data (e.g., technical specification information, cost information, etc.) corresponding to a set of available candidate sensors, physical system data, simulation data, FMECA studies, PRAs, fault trees, SME expert opinions, etc., in order to efficiently and accurately compute the simulation of the complex object, failure mode analysis of candidate sensor suites, and/or performing cost-benefit modeling of candidate sensor suites, etc., but the example embodiments are not limited thereto.

While FIG. 2 depicts an example embodiment of a computing device 2000, the computing device 2000 is not limited thereto, and may include additional and/or alternative architectures that may be suitable for the purposes demonstrated. For example, the functionality of the computing device 2000 may be divided among a plurality of physical, logical, and/or virtual servers and/or computing devices, network elements, etc.

Figure 3A:
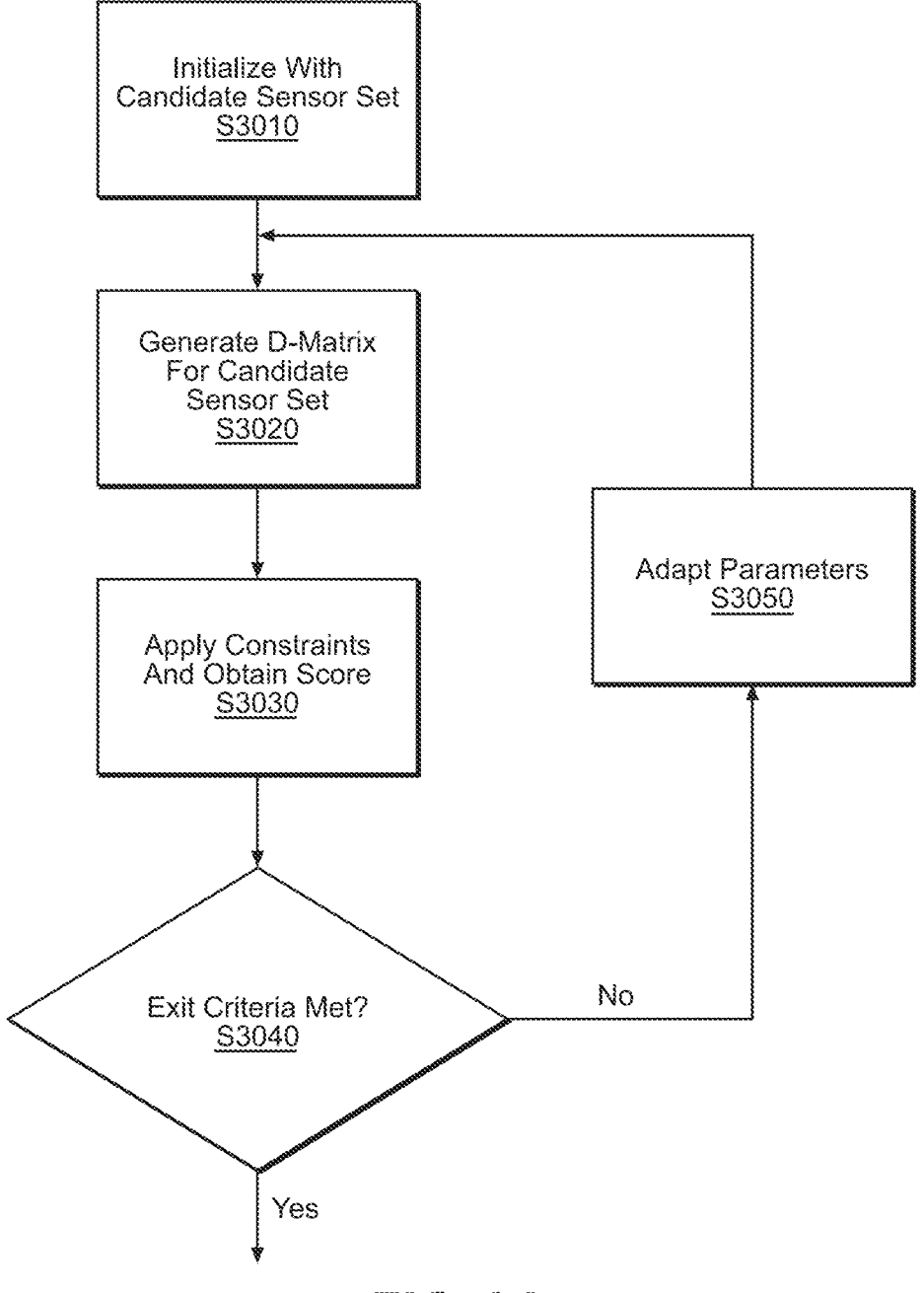
FIGS. 3A and 3B illustrate example methods for generating sensor design recommendations according to some example embodiments.
Figure 3B:
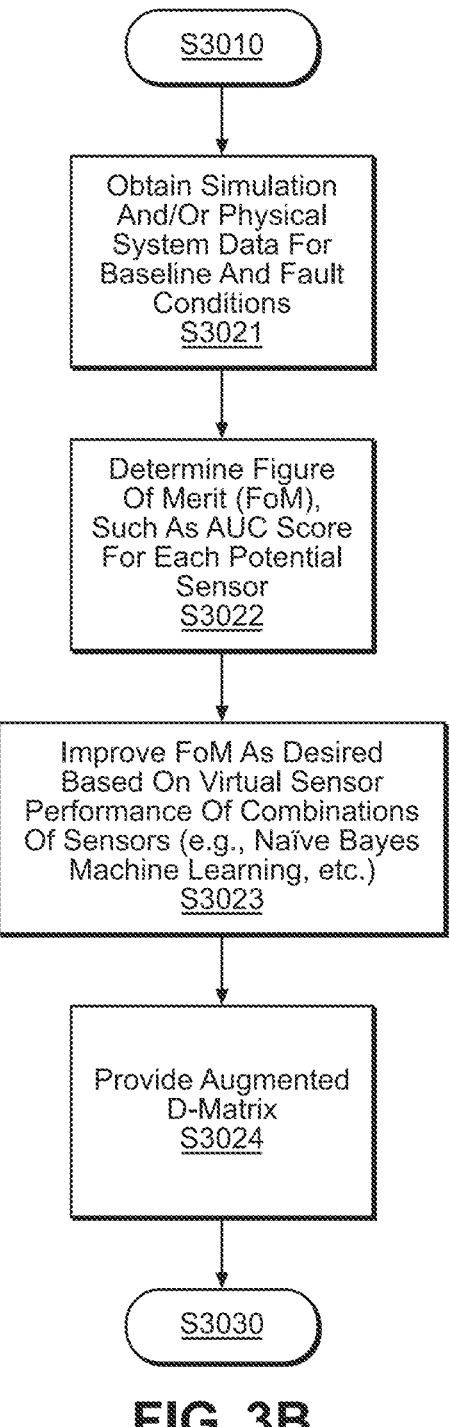
Figure 4C:
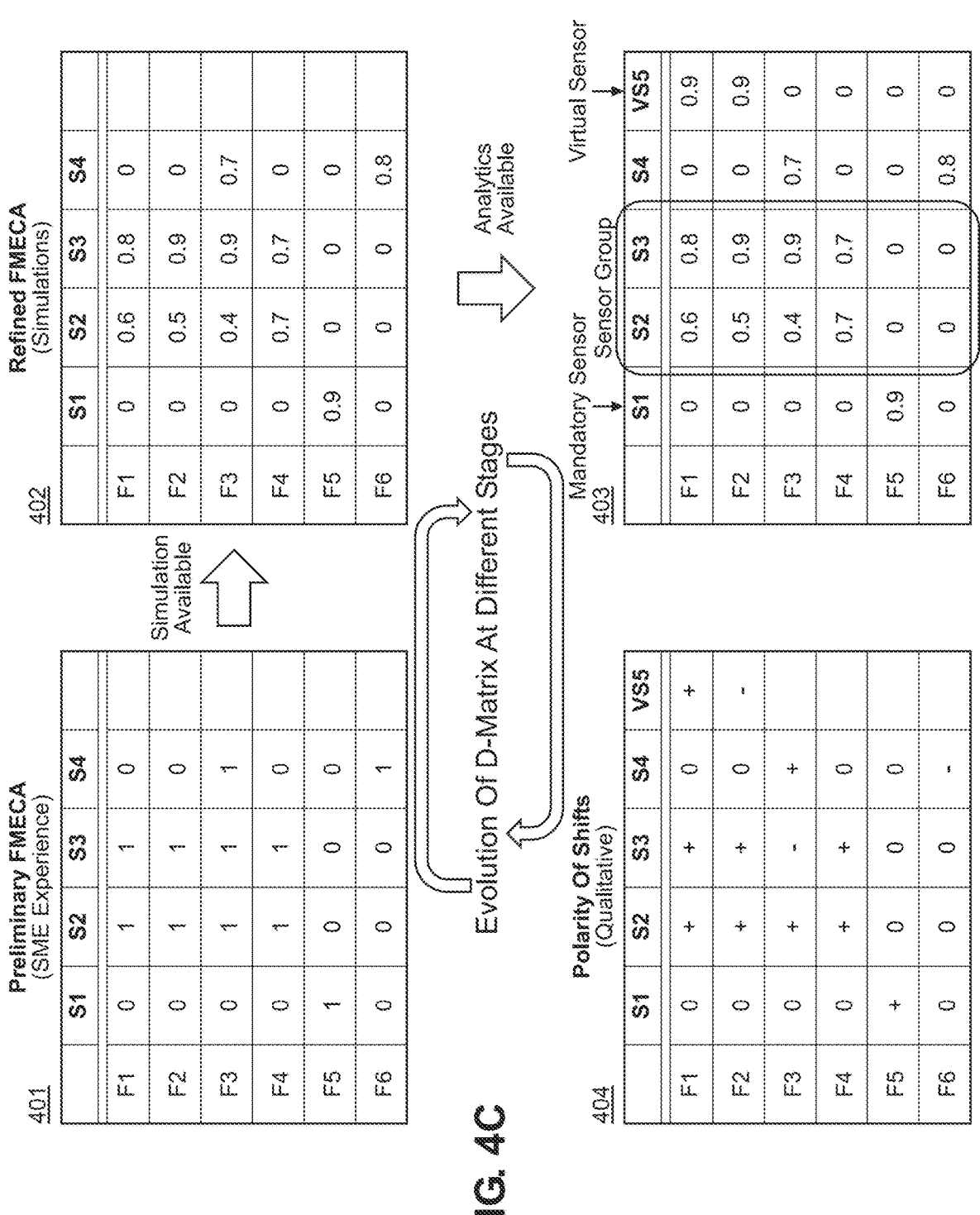
Figure 4D:
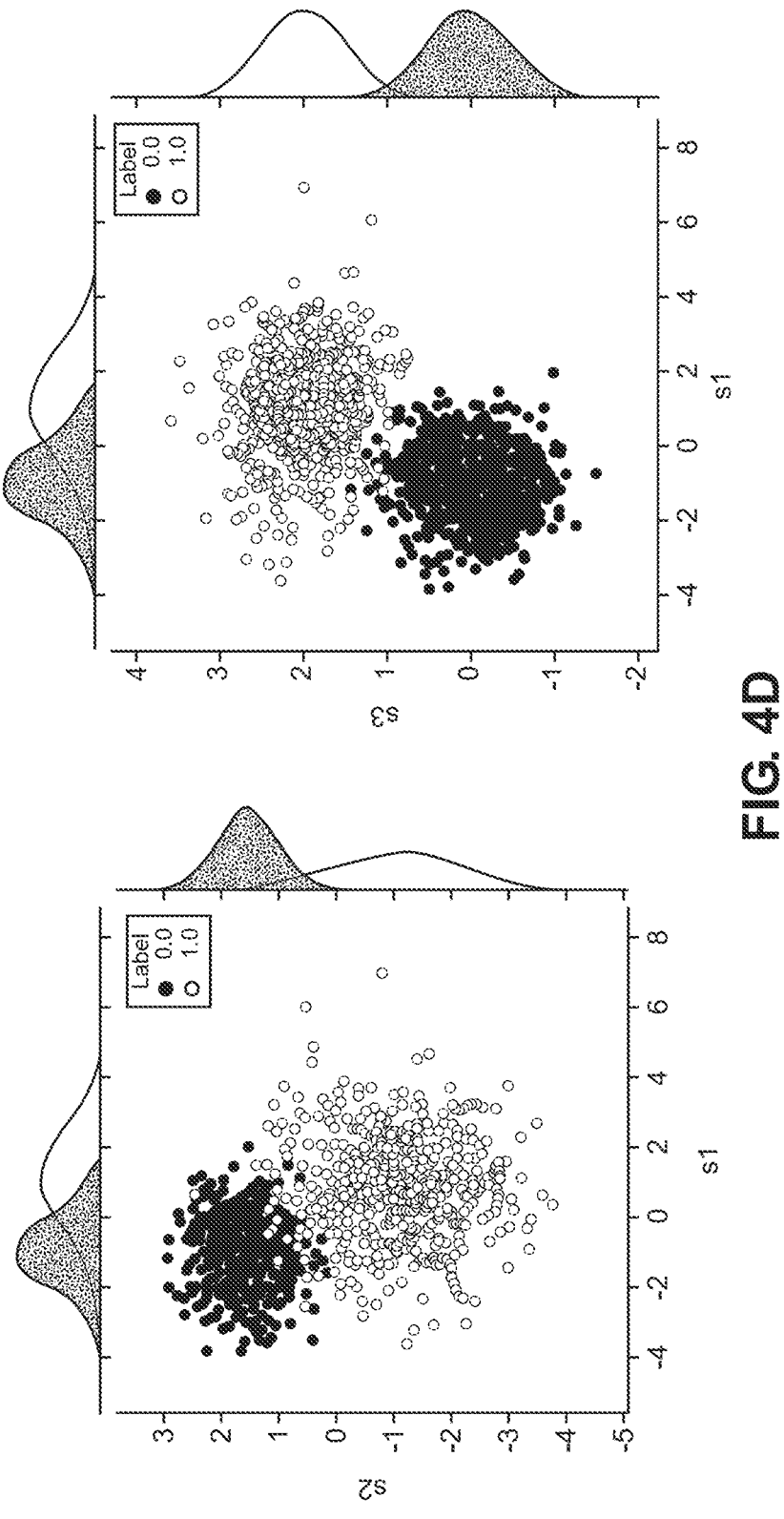
Figure 4E:
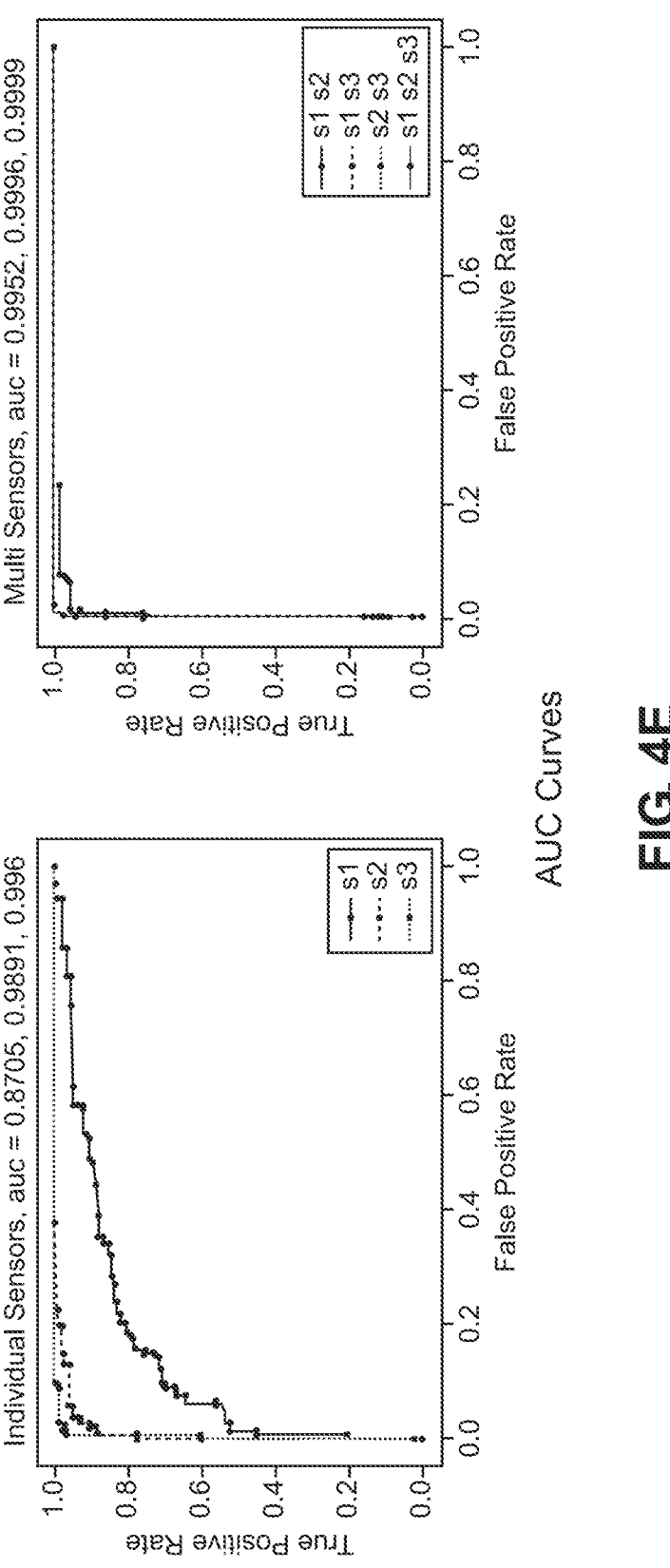

FIG. 3A illustrates an example method for generating sensor design recommendations according to at least one example embodiment, but the example embodiments are not limited thereto. FIG. 3B illustrates an example method of generating a D-matrix corresponding to a candidate sensor suite according to FIG. 3A, but the example embodiments are not limited thereto. FIG. 4A illustrates an example D-matrix and associated metadata. FIG. 4B illustrates an example D-matrix including candidate sensor groups and candidate virtual sensors. FIG. 4C illustrates the stages of the D-matrix augmentation process. FIG. 4D illustrates example sensor data for candidate sensors. FIG. 4E illustrates an Receiver Operating Characteristic (ROC) graph associated with candidate physical sensors and an ROC graph for associated with a candidate virtual sensor. According to at least one example embodiment, the operations of FIGS. 3A and 3B may be performed by the processing circuitry of a computing device, e.g., the processing circuitry 2100 of computing device 2000 of FIG. 2, but the example embodiments are not limited thereto and other suitable computing devices, cloud networks, neural networks, etc., may be used, etc.

Referring now to FIG. 3A, according to at least one example embodiment, in operation S3010, the processing circuitry 2100 may initialize at least one candidate sensor set based on a list of fault scenarios covering identified, anticipated, expected, and/or desired fault conditions and/or failures (hereinafter referred to as "faults," "fault modes," etc.) of the complex object and/or a list of available candidate sensors for potential installation in the complex object (e.g., a superset of potential candidate sensors), etc., but the example embodiments are not limited thereto.

For example, the processing circuitry 2100 may generate the list of fault scenarios based on results of analysis of the system failure modes, effect, and criticality analysis (FMECA) information and/or the Probabilistic Risk Assessment (PRA) information, etc. Each fault scenario included in the list of fault scenarios may be analyzed by the processing circuitry 2100 to determine symptoms of the one or more faults associated with the respective fault scenario based on computer simulations of the complex object and/or similar complex objects, and/or SME analysis of actual data from the complex object and/or similar complex objects, etc. More specifically, the processing circuitry 2100 may simulate various failure scenarios included in the list of fault scenarios on the complex object at different locations/parts of the complex object, at varying severity levels, and/or with different environmental conditions, etc., to determine the symptoms of the faults. For example, a software simulation may be executed using the system simulator (e.g., system simulator 110 of FIG. 1, etc.), where condenser fouling and pipe blockage are simulated at various degrees of fouling and/or blockage, at various sensor noise levels, with different environmental factors (e.g., different operating temperatures, etc.), and/or the like, in order to generate and/or obtain balanced healthy and faulty data, etc. As another example, the symptoms of the faults may be determined based on SME analysis of historical data from the complex object and/or similar objects, but the example embodiments are not limited thereto.

The processing circuitry 2100 will then generate fault observability information based on the determined fault symptoms of the plurality of fault scenarios, etc. The fault observability information may include desired fault detection confidence levels and/or desired fault isolation confidence levels associated with one or more fault conditions, etc., but the example embodiments are not limited thereto. The processing circuitry 2100 may then initialize and/or generate the candidate sensor set (e.g., an initial candidate sensor set, initial candidate sensor suite, etc.) based on the fault observability information, the superset of potential candidate sensors, and/or potential operational locations for the potential candidate sensors, etc., and more specifically, the processing circuitry 2100 may analyze each of the potential candidate sensors (in combination with a potential location) of the superset and determine (e.g., filter, etc.) whether the potential candidate sensor meets one or more desired conditions, parameters, specifications, requirements, etc., of the fault observability information. In other words, the processing circuitry 2100 may determine whether a potential candidate sensor is a candidate sensor by determining whether the potential candidate sensor placed at a desired location detects, senses, monitors, etc., a fault condition within the desired fault detection confidence level and/or desired fault isolation confidence level included in the fault observability information, etc. Additionally, the processing circuitry 2100 may determine a candidate virtual sensor placed at a desired location(s) by determining whether two or more potential candidate physical sensors at desired location(s) may collectively act as a virtual sensor candidate (e.g., a virtual candidate group, etc.) to detect, sense, monitor, etc., a fault condition within the desired fault detection confidence level and/or desired fault isolation confidence level included in the fault observability information, etc.

According to some example embodiments, the processing circuitry 2100 determine a single candidate sensor set which includes all determined and/or identified candidate sensors and/or candidate virtual sensors from the potential candidate sensor superset, or the processing circuitry 2100 may determine a plurality of candidate sensor sets, each of the candidate sensor sets including a desired subset of candidate sensors and/or candidate virtual sensors, different subsets of candidate sensors and/or candidate virtual sensors, but the example embodiments are not limited thereto. For the sake of clarity and brevity, it will be assumed that a single candidate sensor set was determined in operation S3010 for the remainder of this Specification, but the example embodiments are not limited thereto.

In operation S3020, the processing circuitry 2100 may evaluate and/or analyze the candidate sensor set based on inputs, such as SME opinions and/or analysis, computer simulations, physical system data for baseline and/or fault conditions, PHM performance metrics (e.g., fault coverage, false alert rate, true detection rate, etc.), operational requirement information, operational constraint information, cost constraints, etc., in order to generate a dependency matrix (D-matrix) corresponding to the initialized candidate sensor suite, but the example embodiments are not limited thereto. The generation of the D-matrix corresponding to the candidate sensor suite will be discussed in further detail in connection with FIG. 3B.

The processing circuitry 2100 may apply one or more constraints to the D-matrix corresponding to the candidate sensor suite to determine and/or obtain a score, e.g., an overall fault detection coverage score, a total fault detection coverage score, etc., for the candidate sensor suite. More specifically, the processing circuitry 2100 may determine and/or calculate a constrained combinatorial optimization equation as shown below, but the example embodiments are not limited thereto.

$$S = [s_1, \dots, s_m], s_i \in \{0, 1\} \qquad \text{[Equation 1]}$$

wherein the candidate sensor suite includes m candidate sensors; and S is a binary decision vector where 1 indicates a sensor being selected and 0 indicates the sensor is not selected.

Equation 1 may be solved such that a selected subset of sensors improves and/or optimizes the PHM design objectives/constraints based on various project requirements, budget constraints, etc., as modeled below, but not limited thereto.

$$\min \ f(P(s), C(s)) \qquad \text{[Equation 2]}$$
$$\text{s.t. } g(P(s), C(s)) \le 0$$
$$U(s) = 0$$
$$V(s) \le 0$$

wherein $f$, $g$, U and V are the objective, inequality constraint and equality constraint functions respectively. P(s) represents overall PHM performance (such as fault detection and/or fault isolation coverages) as a function of selected sensors. C(s) represents the overall costs associated with the sensors of the candidate sensor suite including, e.g., sensor hardware, installation costs, maintenance costs, costs for implementing the associated PHM functionalities, etc. Function g is an inequality constraint based on PHM performance and costs. U(s) and V(s) represent the inequality and equality sensor grouping constraints that may be used to conduct for evaluation and/or scoring of virtual sensor groups, different locations and/or placements for sensors, etc.

The functions (e.g., $f$, $g$, U and V) may be defined as vector-valued functions. Specifically, when $f$ is defined as a vector-valued objective function, the fault detection coverage scoring takes the form of a multi-objective (and/or Pareto) optimization problem. However, the example embodiments are not limited thereto, and for example, linearly combining multiple objectives with weighting factors may be used and may provide an alternative for balancing performance and cost considerations, etc.

The D-matrix may be used to calculate the fault detection coverage scores and/or fault isolation coverage scores to determine the PHM performance, P(s), of the individual candidate sensors included in the candidate sensor suite and to determine the overall coverage scores for the candidate sensor suite.

For example, the fault detection coverage score (e.g., fault detection confidence score, etc.) may be determined based on the following equation, but is not limited thereto. The fault isolation coverage score may be determined based on a similar equation, and discussion thereof will be omitted to reduce redundancy.

$$P(F_i) = \max(P_{i1} \cdot s_1, \ldots, P_{im} \cdot s_m) \qquad \text{[Equation 3]}$$

wherein $F_i$ represents a fault mode.

A fault mode may be considered "covered" by a candidate sensor-placement combination when its fault detection coverage score (e.g., fault detection confidence, etc.) $P(F_i)$ and fault isolation coverage (FIC) score are both equal to or greater than a user defined threshold, e.g., 0.95, etc., but the example embodiments are not limited thereto.

The sensor suite fault detection coverage (FDC) score (e.g., total fault detection coverage score, overall fault detection coverage score, etc.) may be determined using the following equation, but is not limited thereto. The sensor suite fault isolation coverage (FIC) score may be determined based on a similar equation, and discussion thereof will be omitted to reduce redundancy.

$$FDC = \frac{F_C}{F_T} * 100\% \qquad \text{[Equation 4]}$$

wherein $F_C$ represents the number of covered faults by all of the candidate sensors included in the candidate sensor suite; and $F_T$ is the total number of faults included in the list of fault scenarios/fault observability information, etc. Additionally, according to some example embodiments, fault criticality may be considered in Equation 4 by applying the fault criticality as a weight (not shown) to the $F_C$ variable to emphasis and/or more heavily consider critical faults, more important faults, mandatory faults, etc.

Additionally, the entire list of fault scenarios/fault observability information may be considered "covered" by the candidate sensor suite when its sensor suite fault detection coverage score and its sensor suite fault isolation coverage score are equal to or greater than a user defined threshold for candidate sensor suites (e.g., exit condition, exit criteria, etc.), but the example embodiments are not limited thereto. According to some example embodiments, other criteria may be calculated for as well, such as cost considerations, reliability considerations, etc., and the candidate sensor suite scores for these criteria will be compared to user defined cost threshold values, reliability threshold values, etc., but the example embodiments are not limited thereto.

Moreover, the processing circuitry 2100 may also determine and/or calculate other PHM constraints, cost constraints, user preference constraints, etc., based on the above mathematical framework. According to at least one example embodiment, a user preference constraint provided in a configuration file (e.g., a human-readable data object file format, such as JSON, XML, etc., but not limited thereto) may define an objective and/or constraint function (e.g., U and V in Equation 2) for different scenarios, such as the same candidate sensor placed at different locations, high accuracy/ high cost candidate sensors vs. low accuracy/low cost candidate sensors, a high cost candidate sensor vs. multiple low cost candidate sensors, etc., but the example embodiments are not limited thereto.

For example, if a candidate temperature sensor may be placed at three different locations within the complex object and the user constraint desires to evaluate the sensor-location combinations based on performance and costs, a virtual sensor group may be defined for these three locations, e.g., group X, and an equality constraint may be expressed as (but not limited thereto):

$$U(s, X) - 1 = 0 \qquad \text{[Equation 5]}$$

wherein function U(s,X) returns the number of sensors in decision variable s that belong to "Sensor Group X". If a sensor group is defined by a masking vector, for example:

$$Z_i = [z_{i,1}, \ldots, z_{i,m}], z_{i,j} \in \{0, 1\} \qquad \text{[Equation 6]}$$

wherein $z_{i,m}=1$ indicates sensor $s_m$ belongs to sensor group i, then the sensor grouping constraint in Equation 5 may be rewritten using a dot product formula, as shown below:

$$S \cdot Z_9 = 1 \qquad \text{[Equation 7]}$$

However, the example embodiments are not limited thereto. For example, a user, designer, etc., may define the equality and inequality constraint functions (U and V) for various scenarios, e.g., "pick one sensor from Group 1 and at least 2 sensors from Group 2," optimizing cost efficiency while maintaining fault detection and isolation coverages above 95%, etc., as shown in Table 1 below, but the example embodiments are not limited thereto.

TABLE 1

| User-defined optimization objective and constraint functions. | | |
|---|---|---|
| Use case | | Formulation |
| Optimize cost efficiency while maintaining fault detection and isolation coverages above 95% | min s. t. | C(s) FDC(s) ≥ 95% FIC(s) ≥ 95% |
| Achieve maximum average fault detection and isolation coverages while adhering to a budget limit of $1M, ensuring detectability of all critical faults | min s. t. | −FDC(s) − FIC(s) C(s) ≤ $1M $FDC_{critical}(s) \geq 100\%$ |
| Optimize the weighted average of cost, FDC and FIC | min | C(s) − FDC(s) − FIC(s) |

Once the relevant constraints have been applied and relevant scores have been calculated for the candidate sensor suite, the processing circuitry 2100 may determine whether the candidate sensor suite being analyzed has met the one or more exit criteria (e.g., user defined threshold values) for the complex object, such as the total fault detection coverage score threshold, the total fault isolation coverage score threshold, etc. If the candidate sensor suite has met the exit criteria, then the candidate sensor suite may be added to the list of viable test sensor suites and the next candidate sensor suite may be evaluated (e.g., return to operation S3010). If there is only one viable test sensor suite, the candidate sensor suite may be output as the recommended sensor suite configuration (e.g., optimal sensor suite configuration, etc.). However, the example embodiments are not limited thereto, and for example, the method may be exited once a first viable test sensor suite is identified, etc.

If the candidate sensor suite does not meet the one or more exit criteria, the processing circuitry 2100 may move to operation S3050, and adapt one or more parameters of the candidate sensor suite. For example, one or more candidate physical sensors and/or candidate virtual sensors, etc., may be replaced with different candidate physical sensors and/or candidate virtual sensors (e.g., the candidate physical sensors and/or candidate virtual sensors which fail the PHM constraints thresholds, user constraints thresholds, etc.), the candidate physical sensors and/or candidate virtual sensors may be moved to different locations, etc., and the processing circuitry may return to operation S3020 using the modified candidate sensor suite, etc., but the example embodiments are not limited thereto. Additionally, if the candidate sensor suite is below a desired minimum score threshold, the entire candidate sensor suite may be replaced with a new candidate sensor suite, etc., and the method may be restarted from operation S3010, etc.

Referring now to FIG. 3B and FIG. 4A, according to at least one example embodiment, in operation S3021, after a candidate sensor set has been initialized as discussed in S3010 of FIG. 3A, in operation S3021 of FIG. 3B, the processing circuitry 2100 may begin to generate the D-matrix for a candidate sensor suite by obtaining simulation and/or physical system data for baseline conditions (e.g., normal operating conditions, etc.) and/or fault conditions, etc. Baseline conditions are, for example, normal operating conditions when degradations, faults, and/or, failures are not present. Physical system data includes actual measured sensor data from the complex object. Simulation system data includes data produced through computational models.

As shown in FIG. 4A, the D-matrix includes a plurality of columns each associated with a candidate sensor (e.g., sensors S1 to Sm) and a plurality of rows each associated with a failure mode (e.g., failure modes F1 to Fn). In some example embodiments, the candidate sensor may be capable of sensing, monitoring, and/or observing for more than one "symptom" and/or condition of a failure mode (e.g., a sensor which is capable of measuring temperature, pressure, and humidity, etc.) and separate columns may be included in the D-matrix for the candidate sensor for each symptom, e.g., a column associated with the candidate sensor's temperature measurement capability, a column associated with the candidate sensor's pressure measurement capability, a column associated with the candidate sensor's humidity measurement capability, etc. Further, the D-matrix may also include separate columns associated with different potential locations for the candidate sensor as well, but is not limited thereto. The individual cells of the D-matrix (e.g., P11 to Pnm) may represent the confidence measure (and/or score) for how effectively the individual candidate sensor may detect the fault symptom.

Additionally, the D-matrix may further include metadata associated with the columns, rows, and/or individual cells of the D-matrix. The metadata may indicate, for example, the costs of the candidate sensor, the failure rate of the candidate sensor, sensor groupings, mandatory sensors, failure rates (e.g., frequency that a particular failure mode occurs, etc.), criticality of the failure mode, etc., but the example embodiments are not limited thereto. For example, as shown in FIG. 4B, the D-matrix may indicate whether a sensor is a mandatory sensor, whether a plurality of sensors are included in a sensor group, and/or whether the candidate sensor is a virtual sensor, etc.

Referring again to FIG. 3B, the processing circuitry 2100 may receive these inputs via user inputs and/or data inputs to the system simulator 110 and/or via inputs provided to the candidate sensor suite generator 120, etc. As shown in the D-matrix 401 of FIG. 4C, an initial D-matrix may be generated with preliminary FMECA data and/or SME inputs, but is not limited thereto. The preliminary FMECA data and/or SME inputs may provide binary values for the confidence scores for each of the candidate sensor/failure mode pairs, but are not limited thereto.

However, at later stages of the design, construction, and/or operation of the complex object, improved data (e.g., actual data and/or simulation data), sensor characteristics, and/or tentative fault detection and/or fault isolation algorithms may become available, and/or machine learning algorithms may be used, such as Naïve Bayes Fault Detection Quantification techniques, genetic algorithms, etc. In the example embodiments, it will be assumed that the Naïve Bayes Fault Detection Quantification algorithm is used, but the example embodiments are not limited thereto.

As shown in the D-matrices 402 and 403 of FIG. 4C, the confidence scores of candidate sensor/failure mode pairs may be refined through additional simulations and/or application of analytics, such that non-binary confidence scores are provided in the D-matrix.

As an example, in operation S3022 of FIG. 3B, the confidence scores of the candidate sensor/fault condition pairs may be refined by determining a Figure of Merit (FoM) score, such as an Area Under Curve (AUC) score, but the example embodiments are not limited thereto. For example, the processing circuitry 2100 may obtain simulation data associated with the plurality of candidate sensors included in a candidate sensor suite associated with the plurality of fault conditions, as shown in FIG. 4D, where a scatterplot graphs for candidate sensor s1 and candidate sensor s2 (left graph) and a scatterplot graph for sensor s1 and sensor s3 (right graph) are shown. These sensor values may illustrate the marginal distribution corresponding to the candidate sensors' ability to detect a given fault condition (labeled as "1" on the graphs), and may be raw data or normalized, scaled, and/or calculated data derived from the raw sensor data, etc. The simulation data may then be transformed into FoM scores, e.g., Receiver Operating Characteristic (ROC) curves for fault detection methods, as shown in FIG. 4E, but not limited thereto. As shown in the left ROC graph in FIG. 4E, one or more ROC curves, e.g., the true positive detection rate vs. the false positive detection rate, may be calculated and/or determined by the processing circuitry 2100 for each of the candidate sensors, s1, s2, and s3, but the example embodiments are not limited thereto.

The processing circuitry 2100 may calculate the AUC score, where an AUC scores range from 0 to 1, where 0 represents complete failure to detect the fault, 1 represents perfect detection of the fault, and a score of 0.5 is the equivalent of a random guess (e.g., 50/50 guess), for the candidate sensor to provide a comprehensive evaluation of the candidate sensor's capability to differentiate between a fault and normal (e.g., baseline) condition, etc., as shown in the equation below.

$$\text{Score} = 2 \ x \ (AUC - 0.5) \qquad \text{[Equation 8]}$$

wherein the D-Matrix score ("score") for the candidate sensor for a particular fault condition is calculated based on the difference of the AUC score of the candidate sensor and a desired AUC score (e.g., an AUC score of 0.5, etc.), but the example embodiments are not limited thereto. For example, as an alternative, the D-Matrix score may be defined as the True Positive Rate at a desired False Positive Rate (e.g., 0.05 false positivity rate) on the ROC curve for the candidate sensor/fault condition pair, etc.

In operation S3023 of FIG. 3B, and as shown in the right ROC graph in FIG. 4E, the processing circuitry 2100 may improve the FoM as desired by evaluating anticipated and/or desired virtual sensor performance of a desired combination of sensors, for example, using machine learning approaches, such as Naïve Bayes Fault Detection Quantification algorithms, genetic algorithms, etc. For example, the processing circuitry 2100 may generate one or more ROC curves for virtual candidate sensors and/or candidate sensor groups, e.g., the combination of candidate sensors s1 and s2, the combination of candidate sensors s1 and s3, the combination of candidate sensors s2 and s3, the combination of candidate sensors s1, s2, and s3, etc., but the example embodiments are not limited thereto, and for example, instead of applying a "brute force" method of selecting virtual candidate sensors, the processing circuitry 2100 may select possible virtual candidate sensor combinations based on the individual candidate physical sensors which have the highest individual AUC scores for the fault condition, etc. The virtual candidate sensors may be generated based on Naïve Bayes classifier which is trained using labelled training data for the different combinations of candidate sensors. The fusion of combinations of candidate sensors may provide improved fault detection performance, as shown in FIG. 4E, and therefore may provide a desired and/or required level of fault detection performance.

The processing circuitry 2100 may perform Naïve Bayes Fault Detection Quantification (also referred to as Gaussian Naïve Bayes algorithm, etc.) to assess the ability of individual candidate sensors and the joint probability of groups of candidate sensors (e.g., virtual sensors) to assess faults identified in the rows of the D-matrix. For each individual candidate sensor, the probability of sensed values being part of a baseline distribution $b$ or a fault distribution $f$ are calculated as follows:

$$p(s_i = v|b) = \frac{1}{\sqrt{2\pi\sigma_{ib}^2}} e^{\frac{(v - u_{ib})^2}{2\sigma_{ib}^2}} \qquad \text{[Equation 9]}$$

$$p(s_i = v|f) = \frac{1}{\sqrt{2\pi\sigma_{if}^2}} e^{\frac{(v - u_{if})^2}{2\sigma_{if}^2}} \qquad \text{[Equation 10]}$$

Wherein probability $p(s_i = v|b)$ is the probability that the sensor $s_i$=value v given the system is in baseline conditions and $p(s_i = v|f)$ is the probability under fault condition f.

Naïve Bayes allows for fusing of sensors assuming conditional independence:

$$p(x|C_k) = \frac{\left(\sum_{i=1}^{n} x_i\right)!}{\prod_{i=1}^{n} x_i!} \prod_{i=1}^{n} p_{ki}^{x_i} \qquad \text{[Equation 11]}$$

Wherein, given $p(x|C_k)$ is the relative probability that failure feature vector $x=[x_1, x_2, \ldots, x_n]$ representing sensor values are indicative of class $C_k$, among classification classes $(C_1 \ldots C_k)$, with $p_{ki}^{x_i}$ are the probabilities that feature $x_i$ indicates class k.

Additionally, the processing circuitry 2100 may calculate the closed form solutions for P(F|S) and P(B|S) for Gaussian Naïve Bayes based on the means and standard deviations of each individual candidate sensor.

$$P(Y = 1|X) = \frac{1}{1 + \exp\left(w_0 + \sum_{i=1}^{n} w_i X_i\right)}$$

where the weights $w_1 \ldots w_n$ are given by $$w_i = \frac{\mu_{i0} - \mu_{i1}}{\sigma_i^2}$$

and where $$w_0 = \ln\frac{1 - \pi}{\pi} + \sum_i \frac{\mu_{i1}^2 - \mu_{i0}^2}{2\sigma_i^2} \qquad \text{[Equation 12]}$$

Wherein the mean and standard deviations $\mu$, and $\sigma$ of gaussian distributions representing baseline (0) and fault (1) conditions are used to determine closed form weights.

In operation S3024, the processing circuitry 2100 may complete the augmentation process of calculating the D-Matrix by repeating operations S3021 to S3023 to determine the improved and/or optimized subset of candidate sensors as the improved and/or augmented D-matrix for use in, e.g., operation S3030 of FIG. 3A, but the example embodiments are not limited thereto. The polarity, e.g., "+," "0," or "−" values, indicates if the rising, maintenance, or falling values of a sensor reading distinguishes the faults.

FIGS. 5A to 5F illustrate example graphical user interface (GUI) screens associated with a software application for generating sensor design recommendations according to some example embodiments.

Figure 5A:
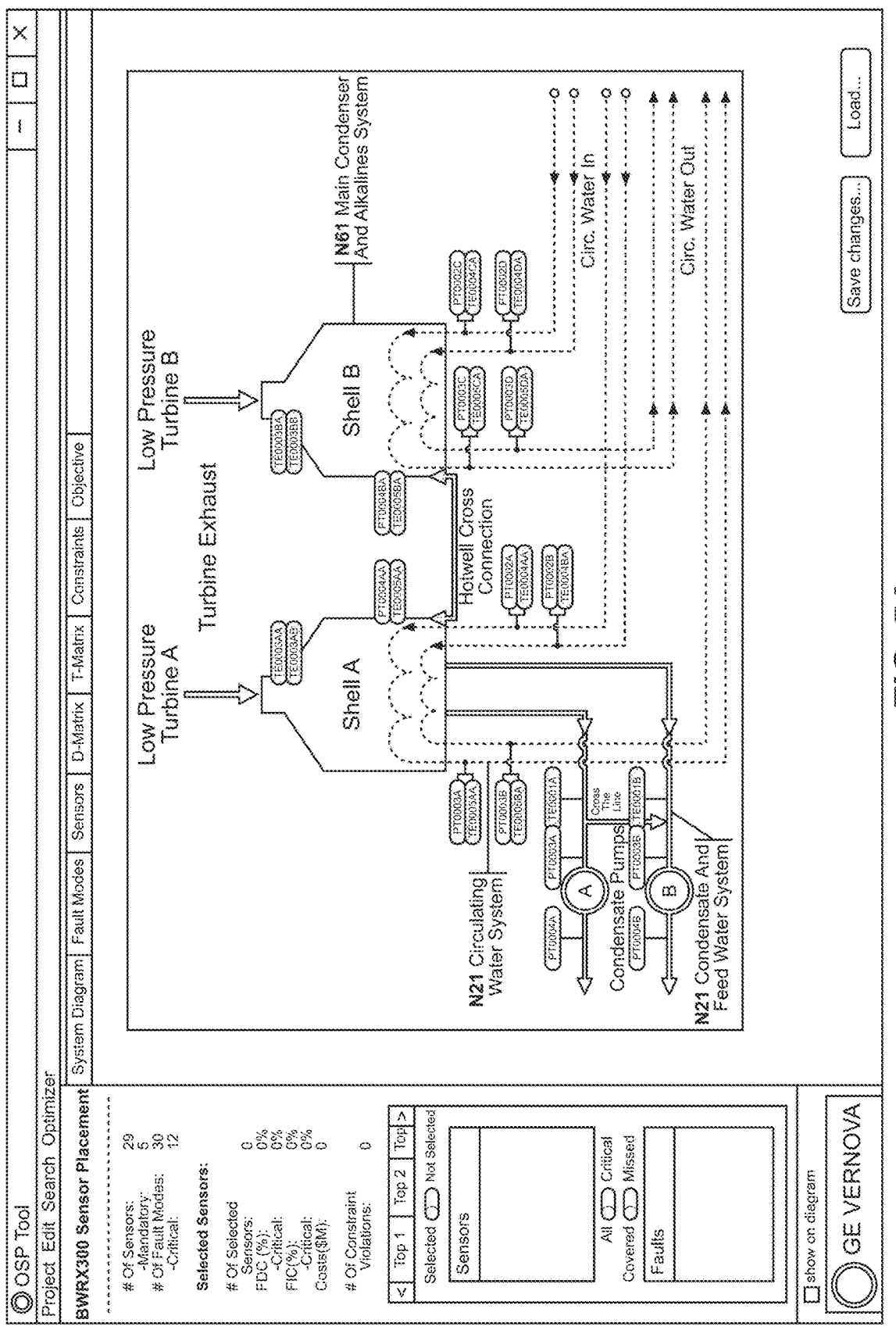

FIG. 5A illustrates a GUI for a system simulator, such as the system simulator 110 of FIG. 1, but the example embodiments are not limited thereto. The system simulator may include at least one UI element wherein a diagram of the complex object may be input, displayed, and/or exported, etc. The diagram (e.g., blueprint, CAD drawing, 3D rendering, etc.) may be generated and/or created via user inputs into the system simulator and/or may be uploaded as a file to the system simulator from a different software program. The system simulator may allow a user to edit the diagram of the complex object, add candidate sensors to the diagram of the complex object, move candidate sensors within the diagram of the complex object, edit candidate sensors within the diagram of the complex object, and/or delete candidate sensors from the diagram of the complex object, etc., but is not limited thereto.

In FIG. 5B, the GUI for the system simulator may further include at least one UI element wherein fault conditions and/or fault modes may be input, displayed, and/or exported, etc. For example, a user may create new fault conditions via the GUI of the system simulator, upload fault conditions from a file, modify existing fault conditions, and/or delete fault conditions, etc. Additionally, the user may add, modify, and/or delete metadata associated with the fault conditions, such as the description of the fault condition, the seasonality of the fault condition, the failure rate associated with the fault condition, the criticality of the fault condition, assign the fault condition to a failure group, etc., but the example embodiments are not limited thereto. The metadata of the fault conditions may then be used for the generation of the D-matrix and evaluation and/or simulation of candidate sensors, etc.

In FIG. 5C, the GUI for the system simulator may further include at least one UI element wherein candidate sensors may be input, displayed, and/or exported, etc. Similar to the GUI for the fault conditions, a user may create new candidate sensors via the GUI of the system simulator, upload candidate sensors from a file, modify existing candidate sensors, and/or delete candidate sensors, etc. Additionally, the user may add, modify, and/or delete metadata associated with the candidate sensors, such as the description of the candidate sensor, the type of candidate sensor, indicate whether the candidate sensor is a mandatory sensor or optional sensor, assign the candidate sensor to a virtual sensor, assign the candidate sensor to a sensor group, indicate the failure rate of the candidate sensor, indicate the cost of the candidate sensor, etc., but the example embodiments are not limited thereto. The metadata of the candidate sensors may then be used for the generation of the D-matrix and evaluation and/or simulation of candidate sensors, etc.

In FIG. 5D, the GUI for the system simulator may further include at least one UI element wherein a D-Matrix for one or more candidate sensor suites is displayed and/or exported. As discussed in detail above, the D-Matrix may indicate the sensor-fault condition correlation scores for each candidate physical sensor and each virtual candidate sensor included in a candidate sensor suite, or in other words, the confidence score that the particular sensor will detect a particular fault condition, etc.

In FIG. 5E, the GUI for the system simulator may further include at least one UI element wherein a trend (T)-Matrix for one or more candidate sensor suites is displayed and/or exported. The T-Matrix has the same structure and dimensionality as the D-Matrix with the exception that the elements in a T-Matrix can only take discrete values, e.g., $\{-1, 0, 1\}$, in which $-1$ indicates a decreasing trend, 0 indicates no change, and 1 indicates an increasing trend (e.g., a fault causes a sensor measurement to increase as compared to its nominal value at the same conditions). T-Matrix assists in fault diagnosis/classification by providing and/or identifying trend shift patterns.

In FIG. 5F, the GUI for the system simulator may further include at least one UI element which allows a user to add, modify, delete, and/or export one or more constraints and/or other variables associated with the complex object. For example, a user may add constraints related to the PHM performance metrics and/or requirement information (e.g., fault coverage requirements, false alert rate metrics, true detection rate metrics, etc.), technical cost and risk assessment information, budget information and/or cost information, etc., for use in the evaluation of the candidate sensors for the complex object using this GUI, but the example embodiments are not limited thereto.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A computing device, the computing device comprising:
   a memory storing computer readable instructions; and
   processing circuitry configured to execute the computer readable instructions to cause the computing device to,
      receive a plurality of fault conditions and an initial sensor suite associated with at least one object to be simulated, the initial sensor suite including a plurality of candidate physical sensors for the at least one object,
      perform failure mode analysis of the initial sensor suite, the performing the failure mode analysis including generating at least one dependency-matrix (D-matrix) based on the plurality of fault conditions and the plurality of candidate physical sensors,
      generate a recommended sensor suite associated with the at least one object based on results of the failure mode analysis, the recommended sensor suite including at least one recommended sensor, the at least one recommended sensor being a subset of the plurality of candidate physical sensors,
      receive a simulation file corresponding to the at least one object to be simulated, the simulation file including baseline condition data of the at least one object to be simulated and at least one fault condition data of the at least one object to be simulated,
      modify the simulation file to include the at least one recommended sensor, and
      display the at least one object to be simulated and the at least one recommended sensor on a display screen using the modified simulation file, the at least one recommended sensor displayed in a recommended location relative to the at least one object, the recommended location determined during the failure mode analysis.

2. The computing device of claim 1, wherein the at least one object is at least one of:
   a power plant, a turbine, a power grid, a jet engine, a factory environment, an environmental system, a HVAC system, a computational system, or any combinations thereof.

3. The computing device of claim 1, wherein the processing circuitry is further configured to execute the computer readable instructions to cause the computing device to:
   determine at least one virtual candidate sensor based on at least two candidate physical sensors of the plurality of candidate physical sensors; and
   add the at least one virtual candidate sensor to the initial sensor suite and the at least one D-matrix.

4. The computing device of claim 3, wherein the processing circuitry is further configured to execute the computer readable instructions to cause the computing device to:
   receive information, the information including at least one of user preference information, system design preference information, sensor preference information, sensor capability information, sensor group information, sensor life-cycle cost information, fault criticality information, fault failure rate information, or any combinations thereof;

determine sensor-fault condition correlation scores for each candidate physical sensor and each virtual candidate sensor included in the at least one D-matrix based on the received information; and select the at least one recommended sensor from the plurality of candidate physical sensors and the at least one virtual candidate sensor based on the determined sensor-fault condition correlation scores.

5. The computing device of claim 3, wherein the processing circuitry is further configured to execute the computer readable instructions to cause the computing device to perform the failure mode analysis of the initial sensor suite by:

selecting a plurality of test sensor suites from the plurality of candidate physical sensors and the at least one virtual candidate sensor, each of the test sensor suites being a different combination of sensors from the plurality of candidate physical sensors and the at least one virtual candidate sensor;

calculating a fault detection score for each of the plurality of test sensor suites for each of the plurality of fault conditions;

determining an overall fault detection coverage score of each of the plurality of fault conditions based on the calculated fault detection scores for each of the plurality of test sensor suites associated with the respective fault condition and a desired threshold fault detection coverage value associated with the respective fault condition; and selecting the at least one recommended sensor from the plurality of test sensor suites based on the determined overall fault detection coverage score of each of the plurality of fault conditions.

6. The computing device of claim 3, wherein the processing circuitry is further configured to execute the computer readable instructions to cause the computing device to perform the failure mode analysis of the initial sensor suite by:

selecting a plurality of test sensor suites from the plurality of candidate physical sensors and the at least one virtual candidate sensor, each of the test sensor suites being a different combination of sensors from the plurality of candidate physical sensors and the at least one virtual candidate sensor;

calculating a fault isolation coverage score for each of the plurality of test sensor suites for each of the plurality of fault conditions; and selecting the at least one recommended sensor from the plurality of test sensor suites based on the calculated fault isolation coverage score of each of the plurality of fault conditions and a desired threshold fault isolation coverage value.

7. The computing device of claim 3, wherein the processing circuitry is further configured to execute the computer readable instructions to cause the computing device to perform the failure mode analysis of the initial sensor suite by:

for each candidate physical sensor and each virtual candidate sensor, simulating life-cycle costs using the respective candidate sensor for at least one physical location corresponding to the at least one object associated with each of the plurality of fault conditions based on initial sensor cost of the respective candidate sensor, maintenance cost of the respective candidate sensor, and savings from avoidance of the respective fault condition;

determining sensor-fault condition correlation scores for the plurality of candidate sensors for the at least one physical location based on the simulated life-cycle costs; and selecting the at least one recommended sensor from the plurality of candidate physical sensors and the at least one virtual candidate sensor based on the determined sensor-fault condition correlation scores.

8. The computing device of claim 3, wherein the processing circuitry is further configured to execute the computer readable instructions to cause the computing device to:

for each candidate physical sensor and each virtual candidate sensor, generate balanced baseline conditions simulation data for baseline conditions for the respective sensor, generate balanced fault condition simulation data for each fault condition for the respective sensor, and determine sensor-fault condition correlation score for the respective sensor based on the generated balanced baseline conditions simulation data and the generated balanced fault condition simulation data; and select the at least one recommended sensor from the plurality of candidate physical sensors and the at least one virtual candidate sensor based on the determined sensor-fault condition correlation scores.

9. A method of operating a computing device, the method comprising:

receiving a plurality of fault conditions and an initial sensor suite associated with at least one object to be simulated, the initial sensor suite including a plurality of candidate physical sensors for the at least one object;

performing failure mode analysis of the initial sensor suite, the performing the failure mode analysis including generating at least one dependency-matrix (D-matrix) based on the plurality of fault conditions and the plurality of candidate physical sensors;

generating a recommended sensor suite associated with the at least one object based on results of the failure mode analysis, the recommended sensor suite including at least one recommended sensor, the at least one recommended sensor being a subset of the plurality of candidate physical sensors;

receiving a simulation file corresponding to the at least one object to be simulated, the simulation file including baseline condition data of the at least one object to be simulated and at least one fault condition data of the at least one object to be simulated;

modifying the simulation file to include the at least one recommended sensor; and displaying the at least one object to be simulated and the at least one recommended sensor on a display screen using the modified simulation file, the at least one recommended sensor displayed in a recommended location relative to the at least one object, the recommended location determined during the failure mode analysis.

10. The method of claim 9, wherein the at least one object is at least one of, a power plant, a turbine, a power grid, a jet engine, a factory environment, an environmental system, a HVAC system, a computational system, or any combinations thereof.

11. The method of claim 9, the method further comprising:

determining at least one virtual candidate sensor based on at least two candidate physical sensors of the plurality of candidate physical sensors; and adding the at least one virtual candidate sensor to the initial sensor suite and the at least one D-matrix.

12. The method of claim 11, the method further comprising:

receiving information, the information including at least one of user preference information, system design preference information, sensor preference information, sensor capability information, sensor group information, sensor life-cycle cost information, fault criticality information, fault failure rate information, or any combinations thereof;

determining sensor-fault condition correlation scores for each candidate physical sensor and each virtual candidate sensor included in the at least one D-matrix based on the received information; and selecting the at least one recommended sensor from the plurality of candidate physical sensors and the at least one virtual candidate sensor based on the determined sensor-fault condition correlation scores.

13. The method of claim 12, the method further comprising:

selecting a plurality of test sensor suites from the plurality of candidate physical sensors and the at least one virtual candidate sensor, each of the test sensor suites being a different combination of sensors from the plurality of candidate physical sensors and the at least one virtual candidate sensor;

calculating a fault detection score for each of the plurality of test sensor suites for each of the plurality of fault conditions;

determining an overall fault detection coverage score of each of the plurality of fault conditions based on the calculated fault detection scores for each of the plurality of test sensor suites associated with the respective fault condition and a desired threshold fault detection coverage value associated with the respective fault condition; and selecting the at least one recommended sensor from the plurality of test sensor suites based on the determined overall fault detection coverage score of each of the plurality of fault conditions.

14. The method of claim 12, the method further comprising:

selecting a plurality of test sensor suites from the plurality of candidate physical sensors and the at least one virtual candidate sensor, each of the test sensor suites being a different combination of sensors from the plurality of candidate physical sensors and the at least one virtual candidate sensor;

calculating a fault isolation coverage score for each of the plurality of test sensor suites for each of the plurality of fault conditions; and selecting the at least one recommended sensor from the plurality of test sensor suites based on the calculated fault isolation coverage score of each of the plurality of fault conditions and a desired threshold fault isolation coverage value.

15. The method of claim 12, the method further comprising:

for each candidate physical sensor and each virtual candidate sensor, simulating life-cycle costs using the respective candidate sensor for at least one physical location corresponding to the at least one object associated with each of the plurality of fault conditions based on initial sensor cost of the respective candidate sensor, maintenance cost of the respective candidate sensor, and savings from avoidance of the respective fault condition;

determining the sensor-fault condition correlation scores for the plurality of candidate sensors for the at least one physical location based on the simulated life-cycle costs; and selecting the at least one recommended sensor from the plurality of candidate physical sensors and the at least one virtual candidate sensor based on the determined sensor-fault condition correlation scores.

16. The method of claim 12, the method further comprising:

for each candidate physical sensor and each virtual candidate sensor, generating balanced baseline conditions simulation data for baseline conditions for the respective sensor, generating balanced fault condition simulation data for each fault condition for the respective sensor, and determining sensor-fault condition correlation score for the respective sensor based on the generated balanced baseline conditions simulation data and the generated balanced fault condition simulation data; and selecting the at least one recommended sensor from the plurality of candidate physical sensors and the at least one virtual candidate sensor based on the determined sensor-fault condition correlation scores.

17. A non-transitory computer readable medium storing computer readable instructions, which when executed by processing circuitry of a computing device, causes the computing device to:

receive a plurality of fault conditions and an initial sensor suite associated with at least one object to be simulated, the initial sensor suite including a plurality of candidate physical sensors for the at least one object;

perform failure mode analysis of the initial sensor suite, the performing the failure mode analysis including generating at least one dependency-matrix (D-matrix) based on the plurality of fault conditions and the plurality of candidate physical sensors;

generate a recommended sensor suite associated with the at least one object based on results of the failure mode analysis, the recommended sensor suite including at least one recommended sensor, the at least one recommended sensor being a subset of the plurality of candidate physical sensors;

receive a simulation file corresponding to the at least one object to be simulated, the simulation file including baseline condition data of the at least one object to be simulated and at least one fault condition data of the at least one object to be simulated;

modify the simulation file to include the at least one recommended sensor; and display the at least one object to be simulated and the at least one recommended sensor on a display screen using the modified simulation file, the at least one recommended sensor displayed in a recommended location relative to the at least one object, the recommended location determined during the failure mode analysis.

18. The non-transitory computer readable medium of claim 17, wherein the computing device is further caused to:

receive information, the information including at least one of user preference information, system design preference information, sensor preference information, sensor capability information, sensor group information, sensor life-cycle cost information, fault criticality information, fault failure rate information, or any combinations thereof;

determine sensor-fault condition correlation scores for each candidate physical sensor included in the at least one D-matrix based on the received information; and select the at least one recommended sensor from the plurality of candidate physical sensors and at least one virtual candidate sensor based on the determined sensor-fault mode correlation scores.

19. The non-transitory computer readable medium of claim 17, wherein the computing device is further caused to perform the failure mode analysis of the initial sensor suite by:

determining at least one virtual candidate sensor based on at least two candidate physical sensors of the plurality of candidate physical sensors;

adding the at least one virtual candidate sensor to the initial sensor suite and the at least one D-matrix;

selecting a plurality of test sensor suites from the plurality of candidate physical sensors and the at least one virtual candidate sensor, each of the test sensor suites being a different combination of sensors from the plurality of candidate physical sensors and the at least one virtual candidate sensor;

calculating a fault detection score for each of the plurality of test sensor suites for each of the plurality of fault conditions;

determining an overall fault detection coverage score of each of the plurality of fault conditions based on the calculated fault detection scores for each of the plurality of test sensor suites associated with the respective fault condition and a desired threshold fault detection coverage value associated with the respective fault condition; and selecting the at least one recommended sensor from the plurality of test sensor suites based on the determined overall fault detection coverage score of each of the plurality of fault conditions.

20. The non-transitory computer readable medium of claim 17, wherein the computing device is further caused to perform the failure mode analysis of the initial sensor suite by:

determining at least one virtual candidate sensor based on at least two candidate physical sensors of the plurality of candidate physical sensors;

adding the at least one virtual candidate sensor to the initial sensor suite and the at least one D-matrix;

for each candidate physical sensor and each virtual candidate sensor, simulating life-cycle costs using the respective candidate sensor for at least one physical location corresponding to the at least one object associated with each of the plurality of fault conditions based on initial sensor cost of the respective candidate sensor, maintenance cost of the respective candidate sensor, and savings from avoidance of the respective fault condition;

determining sensor-fault condition correlation scores for the plurality of candidate sensors for the at least one physical location based on the simulated life-cycle costs; and selecting the at least one recommended sensor from the plurality of candidate physical sensors and the at least one virtual candidate sensor based on the determined sensor-fault condition correlation scores.

* * * * *